United States Patent
Berlin et al.

(10) Patent No.: US 8,548,330 B2
(45) Date of Patent: Oct. 1, 2013

(54) SECTORIZATION IN DISTRIBUTED ANTENNA SYSTEMS, AND RELATED COMPONENTS AND METHODS

(75) Inventors: Igor Berlin, Potomac, MD (US); William P. Cune, Charlotte, NC (US); Jason E. Greene, Hickory, NC (US); Michael Sauer, Corning, NY (US); Gerald B. Schmidt, Painted Post, NY (US)

(73) Assignee: Corning Cable Systems LLC, Hickory, NC (US)

( * ) Notice: Subject to any disclaimer, the term of this patent is extended or adjusted under 35 U.S.C. 154(b) by 385 days.

(21) Appl. No.: 12/914,585

(22) Filed: Oct. 28, 2010

(65) Prior Publication Data

US 2011/0268449 A1 Nov. 3, 2011

Related U.S. Application Data

(60) Provisional application No. 61/330,383, filed on May 2, 2010, provisional application No. 61/230,463, filed on Jul. 31, 2009, provisional application No. 61/230,472, filed on Jul. 31, 2009.

(51) Int. Cl.
*H04B 10/00* (2013.01)
(52) U.S. Cl.
USPC .......... 398/115; 398/116; 398/79; 455/422.1; 340/2.22
(58) Field of Classification Search
USPC ............. 398/79, 115–117; 455/422.1–562.1; 340/2.22; 370/280–338; 379/56.2
See application file for complete search history.

(56) References Cited

U.S. PATENT DOCUMENTS

| 4,365,865 A | 12/1982 | Stiles |
| 4,867,527 A | 9/1989 | Dotti et al. |
| 4,889,977 A | 12/1989 | Haydon |

(Continued)

FOREIGN PATENT DOCUMENTS

| AU | 645192 B | 1/1994 |
| AU | 731180 B2 | 3/2001 |

(Continued)

OTHER PUBLICATIONS

Cooper, A.J., "Fiber/Radio for the Provision of Cordless/Mobile Telephony Services in the Access Network," Electronics Letters, vol. 26, pp. 2054-2056, 1990.

(Continued)

*Primary Examiner* — Li Liu
(74) *Attorney, Agent, or Firm* — C. Keith Montgomery

(57) ABSTRACT

Embodiments disclosed provide sectorization in distributed antenna systems, and related components and methods. The antenna units in the distributed antenna systems can be sectorized. In this regard, one or more radio bands distributed by the distributed antenna systems can be allocated to one or more sectors. The antenna units in the distributed antenna systems are also allocated to one or more sectors. In this manner, only radio frequency (RF) communications signals in the radio band(s) allocated to given sector(s) are distributed the antenna unit allocated to the same sector(s). The bandwidth capacity of the antenna unit is split among the radio band(s) allocated to sector(s) allocated to the antenna unit. The sectorization of the radio band(s) and the antenna units can be configured and/or altered based on capacity needs for given radio bands in antenna coverage areas provide by the antenna units.

29 Claims, 12 Drawing Sheets

(56) References Cited

U.S. PATENT DOCUMENTS

| | | |
|---|---|---|
| 4,896,939 A | 1/1990 | O'Brien |
| 4,916,460 A | 4/1990 | Powell |
| 5,039,195 A | 8/1991 | Jenkins et al. |
| 5,042,086 A | 8/1991 | Cole et al. |
| 5,125,060 A | 6/1992 | Edmundson |
| 5,189,718 A | 2/1993 | Barrett et al. |
| 5,189,719 A | 2/1993 | Coleman et al. |
| 5,206,655 A | 4/1993 | Caille et al. |
| 5,210,812 A | 5/1993 | Nilsson et al. |
| 5,260,957 A | 11/1993 | Hakimi et al. |
| 5,263,108 A | 11/1993 | Kurokawa et al. |
| 5,267,122 A | 11/1993 | Glover et al. |
| 5,268,971 A | 12/1993 | Nilsson et al. |
| 5,299,947 A | 4/1994 | Barnard |
| 5,301,056 A | 4/1994 | O'Neill |
| 5,339,058 A | 8/1994 | Lique |
| 5,339,184 A | 8/1994 | Tang |
| 5,377,035 A | 12/1994 | Wang et al. |
| 5,379,455 A | 1/1995 | Koschek |
| 5,400,391 A | 3/1995 | Emura et al. |
| 5,424,864 A | 6/1995 | Emura |
| 5,444,564 A | 8/1995 | Newberg |
| 5,457,557 A | 10/1995 | Zarem et al. |
| 5,459,727 A | 10/1995 | Vannucci |
| 5,469,523 A | 11/1995 | Blew et al. |
| 5,543,000 A | 8/1996 | Lique |
| 5,546,443 A | 8/1996 | Raith |
| 5,557,698 A | 9/1996 | Gareis et al. |
| 5,574,815 A | 11/1996 | Kneeland |
| 5,598,288 A | 1/1997 | Collar |
| 5,615,034 A | 3/1997 | Hori |
| 5,627,879 A | 5/1997 | Russell et al. |
| 5,640,678 A | 6/1997 | Ishikawa et al. |
| 5,644,622 A | 7/1997 | Russell et al. |
| 5,648,961 A | 7/1997 | Ebihara |
| 5,651,081 A | 7/1997 | Blew et al. |
| 5,668,562 A | 9/1997 | Cutrer et al. |
| 5,677,974 A | 10/1997 | Elms et al. |
| 5,682,256 A | 10/1997 | Motley et al. |
| 5,703,602 A | 12/1997 | Casebolt |
| 5,726,984 A | 3/1998 | Kubler et al. |
| 5,790,536 A | 8/1998 | Mahany et al. |
| 5,790,606 A | 8/1998 | Dent |
| 5,802,473 A | 9/1998 | Rutledge et al. |
| 5,805,983 A | 9/1998 | Naidu et al. |
| 5,812,296 A | 9/1998 | Tarusawa et al. |
| 5,818,619 A | 10/1998 | Medved et al. |
| 5,821,510 A | 10/1998 | Cohen et al. |
| 5,825,651 A | 10/1998 | Gupta et al. |
| 5,838,474 A | 11/1998 | Stilling |
| 5,852,651 A * | 12/1998 | Fischer et al. ............... 379/56.2 |
| 5,854,986 A | 12/1998 | Dorren et al. |
| 5,867,485 A | 2/1999 | Chambers et al. |
| 5,881,200 A | 3/1999 | Burt |
| 5,883,882 A | 3/1999 | Schwartz |
| 5,896,568 A | 4/1999 | Tseng et al. |
| 5,903,834 A | 5/1999 | Wallstedt et al. |
| 5,910,776 A | 6/1999 | Black |
| 5,913,003 A | 6/1999 | Arroyo et al. |
| 5,917,636 A | 6/1999 | Wake et al. |
| 5,930,682 A | 7/1999 | Schwartz et al. |
| 5,936,754 A | 8/1999 | Ariyavisitakul et al. |
| 5,943,372 A | 8/1999 | Gans et al. |
| 5,946,622 A | 8/1999 | Bojeryd |
| 5,949,564 A | 9/1999 | Wake |
| 5,959,531 A | 9/1999 | Gallagher, III et al. |
| 5,960,344 A | 9/1999 | Mahany |
| 5,969,837 A | 10/1999 | Farber et al. |
| 5,983,070 A | 11/1999 | Georges et al. |
| 5,987,303 A | 11/1999 | Dutta et al. |
| 6,005,884 A | 12/1999 | Cook et al. |
| 6,006,105 A | 12/1999 | Rostoker et al. |
| 6,014,546 A | 1/2000 | Georges et al. |
| 6,016,426 A | 1/2000 | Bodell |
| 6,023,625 A | 2/2000 | Myers, Jr. |
| 6,088,381 A | 7/2000 | Myers, Jr. |
| 6,127,917 A | 10/2000 | Tuttle |
| 6,128,470 A | 10/2000 | Naidu et al. |
| 6,148,041 A | 11/2000 | Dent |
| 6,150,921 A | 11/2000 | Werb et al. |
| 6,157,810 A | 12/2000 | Georges et al. |
| 6,222,503 B1 | 4/2001 | Gietema et al. |
| 6,232,870 B1 | 5/2001 | Garber et al. |
| 6,236,789 B1 | 5/2001 | Fitz |
| 6,240,274 B1 | 5/2001 | Izadpanah |
| 6,268,946 B1 | 7/2001 | Larkin et al. |
| 6,292,673 B1 | 9/2001 | Maeda et al. |
| 6,308,085 B1 * | 10/2001 | Shoki ...................... 455/562.1 |
| 6,314,163 B1 | 11/2001 | Acampora |
| 6,317,599 B1 | 11/2001 | Rappaport et al. |
| 6,323,980 B1 | 11/2001 | Bloom |
| 6,324,391 B1 | 11/2001 | Bodell |
| 6,330,244 B1 | 12/2001 | Swartz et al. |
| 6,337,754 B1 | 1/2002 | Imajo |
| 6,353,406 B1 | 3/2002 | Lanzl et al. |
| 6,353,600 B1 | 3/2002 | Schwartz et al. |
| 6,374,078 B1 | 4/2002 | Williams et al. |
| 6,374,124 B1 | 4/2002 | Slabinski |
| 6,389,010 B1 | 5/2002 | Kubler et al. |
| 6,405,018 B1 | 6/2002 | Reudink et al. |
| 6,405,058 B2 | 6/2002 | Bobier |
| 6,405,308 B1 | 6/2002 | Gupta et al. |
| 6,438,301 B1 | 8/2002 | Johnson et al. |
| 6,438,371 B1 | 8/2002 | Fujise et al. |
| 6,452,915 B1 | 9/2002 | Jorgensen |
| 6,477,154 B1 | 11/2002 | Cheong et al. |
| 6,486,907 B1 | 11/2002 | Farber et al. |
| 6,496,290 B1 | 12/2002 | Lee |
| 6,501,965 B1 | 12/2002 | Lucidarme |
| 6,504,636 B1 | 1/2003 | Seto et al. |
| 6,512,478 B1 | 1/2003 | Chien |
| 6,519,395 B1 | 2/2003 | Bevan et al. |
| 6,525,855 B1 | 2/2003 | Westbrook et al. |
| 6,556,551 B1 | 4/2003 | Schwartz |
| 6,577,794 B1 | 6/2003 | Currie et al. |
| 6,577,801 B2 | 6/2003 | Broderick et al. |
| 6,580,402 B2 | 6/2003 | Navarro et al. |
| 6,580,905 B1 | 6/2003 | Naidu et al. |
| 6,580,918 B1 | 6/2003 | Leickel et al. |
| 6,583,763 B2 | 6/2003 | Judd |
| 6,594,496 B2 | 7/2003 | Schwartz |
| 6,597,325 B2 | 7/2003 | Judd et al. |
| 6,606,430 B2 | 8/2003 | Bartur et al. |
| 6,615,074 B2 | 9/2003 | Mickle et al. |
| 6,634,811 B1 | 10/2003 | Gertel et al. |
| 6,636,747 B2 | 10/2003 | Harada et al. |
| 6,640,103 B1 | 10/2003 | Inman et al. |
| 6,643,437 B1 | 11/2003 | Park |
| 6,652,158 B2 | 11/2003 | Bartur et al. |
| 6,654,616 B1 | 11/2003 | Pope, Jr. et al. |
| 6,657,535 B1 | 12/2003 | Magbie et al. |
| 6,658,269 B1 | 12/2003 | Golemon et al. |
| 6,670,930 B2 | 12/2003 | Navarro |
| 6,675,294 B1 | 1/2004 | Gupta et al. |
| 6,687,437 B1 | 2/2004 | Starnes et al. |
| 6,690,328 B2 | 2/2004 | Judd |
| 6,696,917 B1 * | 2/2004 | Heitner et al. ............... 340/2.22 |
| 6,704,545 B1 | 3/2004 | Wala |
| 6,710,366 B1 | 3/2004 | Lee et al. |
| 6,731,880 B2 | 5/2004 | Westbrook et al. |
| 6,758,913 B1 | 7/2004 | Tunney et al. |
| 6,763,226 B1 | 7/2004 | McZeal, Jr. |
| 6,771,862 B2 | 8/2004 | Karnik et al. |
| 6,771,933 B1 | 8/2004 | Eng et al. |
| 6,784,802 B1 | 8/2004 | Stanescu |
| 6,785,558 B1 | 8/2004 | Stratford et al. |
| 6,788,666 B1 | 9/2004 | Linebarger et al. |
| 6,801,767 B1 | 10/2004 | Schwartz et al. |
| 6,807,374 B1 | 10/2004 | Imajo et al. |
| 6,812,824 B1 | 11/2004 | Goldinger et al. |
| 6,812,905 B2 | 11/2004 | Thomas et al. |
| 6,826,164 B2 | 11/2004 | Mani et al. |
| 6,826,337 B2 | 11/2004 | Linnell |
| 6,842,433 B2 | 1/2005 | West et al. |

| Patent | Type | Date | Name |
|---|---|---|---|
| 6,847,856 | B1 | 1/2005 | Bohannon |
| 6,850,510 | B2 | 2/2005 | Kubler et al. |
| 6,865,390 | B2 | 3/2005 | Goss et al. |
| 6,873,823 | B2 | 3/2005 | Hasarchi et al. |
| 6,876,056 | B2 | 4/2005 | Tilmans et al. |
| 6,879,290 | B1 | 4/2005 | Toutain et al. |
| 6,883,710 | B2 | 4/2005 | Chung |
| 6,885,846 | B1 | 4/2005 | Panasik et al. |
| 6,889,060 | B2 | 5/2005 | Fernando et al. |
| 6,909,399 | B1 | 6/2005 | Zegelin et al. |
| 6,915,058 | B2 | 7/2005 | Pons |
| 6,919,858 | B2 | 7/2005 | Rofougaran |
| 6,920,330 | B2 | 7/2005 | Caronni et al. |
| 6,924,997 | B2 | 8/2005 | Chen et al. |
| 6,930,987 | B1 | 8/2005 | Fukuda et al. |
| 6,931,183 | B2 | 8/2005 | Panak et al. |
| 6,933,849 | B2 | 8/2005 | Sawyer |
| 6,961,312 | B2 | 11/2005 | Kubler et al. |
| 6,963,289 | B2 | 11/2005 | Aljadeff et al. |
| 6,963,552 | B2 | 11/2005 | Sabat, Jr. et al. |
| 6,965,718 | B2 | 11/2005 | Koertel |
| 6,968,107 | B2 | 11/2005 | Belardi et al. |
| 6,970,652 | B2 | 11/2005 | Zhang et al. |
| 6,973,243 | B2 | 12/2005 | Koyasu et al. |
| 6,974,262 | B1 | 12/2005 | Rickenbach |
| 7,006,465 | B2 | 2/2006 | Toshimitsu et al. |
| 7,013,087 | B2 | 3/2006 | Suzuki et al. |
| 7,015,826 | B1 | 3/2006 | Chan et al. |
| 7,020,473 | B2 | 3/2006 | Splett |
| 7,024,166 | B2 | 4/2006 | Wallace |
| 7,035,512 | B2 | 4/2006 | Van Bijsterveld |
| 7,039,399 | B2 | 5/2006 | Fischer |
| 7,047,028 | B2 | 5/2006 | Cagenius |
| 7,050,017 | B2 | 5/2006 | King et al. |
| 7,053,838 | B2 | 5/2006 | Judd |
| 7,054,513 | B2 | 5/2006 | Herz et al. |
| 7,072,586 | B2 | 7/2006 | Aburakawa et al. |
| 7,082,320 | B2 | 7/2006 | Kattukaran et al. |
| 7,084,769 | B2 | 8/2006 | Bauer et al. |
| 7,093,985 | B2 | 8/2006 | Lord et al. |
| 7,106,931 | B2 | 9/2006 | Sutehall et al. |
| 7,114,859 | B1 | 10/2006 | Tuohimaa et al. |
| 7,127,175 | B2 | 10/2006 | Mani et al. |
| 7,127,176 | B2 | 10/2006 | Sasaki |
| 7,142,503 | B1 | 11/2006 | Grant et al. |
| 7,142,535 | B2 | 11/2006 | Kubler et al. |
| 7,160,032 | B2 | 1/2007 | Nagashima et al. |
| 7,199,443 | B2 | 4/2007 | Elsharawy |
| 7,200,305 | B2 | 4/2007 | Dion et al. |
| 7,200,391 | B2 | 4/2007 | Chung et al. |
| 7,228,072 | B2 | 6/2007 | Mickelsson et al. |
| 7,263,293 | B2 | 8/2007 | Ommodt et al. |
| 7,269,311 | B2 | 9/2007 | Kim et al. |
| 7,286,843 | B2 | 10/2007 | Scheck |
| 7,286,854 | B2 | 10/2007 | Ferrato et al. |
| 7,295,119 | B2 | 11/2007 | Rappaport et al. |
| 7,310,430 | B1 | 12/2007 | Mallya et al. |
| 7,313,415 | B2 | 12/2007 | Wake et al. |
| 7,315,735 | B2 | 1/2008 | Graham |
| 7,324,730 | B2 | 1/2008 | Varkey et al. |
| 7,343,164 | B2 | 3/2008 | Kallstenius |
| 7,349,633 | B2 | 3/2008 | Lee et al. |
| 7,359,408 | B2 | 4/2008 | Kim |
| 7,359,674 | B2 | 4/2008 | Markki et al. |
| 7,366,150 | B2 | 4/2008 | Lee et al. |
| 7,366,151 | B2 | 4/2008 | Kubler et al. |
| 7,369,526 | B2 | 5/2008 | Lechleider et al. |
| 7,379,669 | B2 | 5/2008 | Kim |
| 7,392,029 | B2 | 6/2008 | Pronkine |
| 7,394,883 | B2 | 7/2008 | Funakubo et al. |
| 7,403,156 | B2 | 7/2008 | Coppi et al. |
| 7,409,159 | B2 | 8/2008 | Izadpanah |
| 7,412,224 | B2 | 8/2008 | Kotola et al. |
| 7,424,228 | B1 | 9/2008 | Williams et al. |
| 7,444,051 | B2 | 10/2008 | Tatat et al. |
| 7,450,853 | B2 | 11/2008 | Kim et al. |
| 7,450,854 | B2 | 11/2008 | Lee et al. |
| 7,451,365 | B2 | 11/2008 | Wang et al. |
| 7,460,507 | B2 | 12/2008 | Kubler et al. |
| 7,460,829 | B2 | 12/2008 | Utsumi et al. |
| 7,460,831 | B2 | 12/2008 | Hasarchi |
| 7,466,925 | B2 | 12/2008 | Iannelli |
| 7,469,105 | B2 | 12/2008 | Wake et al. |
| 7,477,597 | B2 | 1/2009 | Segel |
| 7,483,504 | B2 | 1/2009 | Shapira et al. |
| 7,496,070 | B2 | 2/2009 | Vesuna |
| 7,496,384 | B2 | 2/2009 | Seto et al. |
| 7,522,552 | B2 | 4/2009 | Fein et al. |
| 7,542,452 | B2 | 6/2009 | Penumetsa |
| 7,548,695 | B2 | 6/2009 | Wake |
| 7,551,641 | B2 | 6/2009 | Pirzada et al. |
| 7,557,758 | B2 | 7/2009 | Rofougaran |
| 7,580,384 | B2 | 8/2009 | Kubler et al. |
| 7,586,861 | B2 | 9/2009 | Kubler et al. |
| 7,590,354 | B2 | 9/2009 | Sauer et al. |
| 7,599,420 | B2 | 10/2009 | Forenza et al. |
| 7,630,690 | B2 | 12/2009 | Kaewell, Jr. et al. |
| 7,633,934 | B2 | 12/2009 | Kubler et al. |
| 7,646,743 | B2 | 1/2010 | Kubler et al. |
| 7,646,777 | B2 | 1/2010 | Hicks, III et al. |
| 7,653,397 | B2 | 1/2010 | Pernu et al. |
| 7,668,565 | B2 | 2/2010 | Ylänen et al. |
| 7,688,811 | B2 | 3/2010 | Kubler et al. |
| 7,693,486 | B2 | 4/2010 | Kasslin et al. |
| 7,697,467 | B2 | 4/2010 | Kubler et al. |
| 7,715,375 | B2 | 5/2010 | Kubler et al. |
| 7,715,722 | B1 * | 5/2010 | Hoke et al. .................. 398/115 |
| 7,751,374 | B2 | 7/2010 | Donovan |
| 7,751,838 | B2 | 7/2010 | Ramesh et al. |
| 7,760,703 | B2 | 7/2010 | Kubler et al. |
| 7,768,951 | B2 | 8/2010 | Kubler et al. |
| 7,773,573 | B2 | 8/2010 | Chung et al. |
| 7,778,603 | B2 | 8/2010 | Palin et al. |
| 7,809,012 | B2 | 10/2010 | Ruuska et al. |
| 7,817,969 | B2 | 10/2010 | Castaneda et al. |
| 7,835,328 | B2 | 11/2010 | Stephens et al. |
| 7,848,316 | B2 | 12/2010 | Kubler et al. |
| 7,853,234 | B2 | 12/2010 | Afsahi |
| 7,870,321 | B2 | 1/2011 | Rofougaran |
| 7,881,755 | B1 | 2/2011 | Mishra et al. |
| 7,894,423 | B2 | 2/2011 | Kubler et al. |
| 7,899,007 | B2 | 3/2011 | Kubler et al. |
| 7,907,972 | B2 | 3/2011 | Walton et al. |
| 7,912,043 | B2 | 3/2011 | Kubler et al. |
| 7,916,706 | B2 | 3/2011 | Kubler et al. |
| 7,920,553 | B2 | 4/2011 | Kubler et al. |
| 7,924,783 | B1 | 4/2011 | Mahany et al. |
| 7,936,713 | B2 | 5/2011 | Kubler et al. |
| 7,949,364 | B2 | 5/2011 | Kasslin et al. |
| 7,957,777 | B1 | 6/2011 | Vu et al. |
| 7,969,009 | B2 | 6/2011 | Chandrasekaran |
| 7,969,911 | B2 | 6/2011 | Mahany et al. |
| 7,990,925 | B2 | 8/2011 | Tinnakornsrisuphap et al. |
| 7,996,020 | B1 | 8/2011 | Chhabra |
| 8,010,116 | B2 | 8/2011 | Scheinert |
| 8,018,907 | B2 | 9/2011 | Kubler et al. |
| 8,036,308 | B2 | 10/2011 | Rofougaran |
| 8,082,353 | B2 | 12/2011 | Huber et al. |
| 8,086,192 | B2 | 12/2011 | Rofougaran et al. |
| 8,229,497 | B2 | 7/2012 | Scheinert |
| 8,310,963 | B2 * | 11/2012 | Singh ........................... 370/280 |
| 2002/0003645 | A1 | 1/2002 | Kim et al. |
| 2002/0012495 | A1 | 1/2002 | Sasai et al. |
| 2002/0048071 | A1 | 4/2002 | Suzuki et al. |
| 2002/0075906 | A1 | 6/2002 | Cole et al. |
| 2002/0092347 | A1 | 7/2002 | Niekerk et al. |
| 2002/0111149 | A1 | 8/2002 | Shoki |
| 2002/0111192 | A1 | 8/2002 | Thomas et al. |
| 2002/0114038 | A1 | 8/2002 | Arnon et al. |
| 2002/0123365 | A1 | 9/2002 | Thorson et al. |
| 2002/0126967 | A1 | 9/2002 | Panak et al. |
| 2002/0130778 | A1 | 9/2002 | Nicholson |
| 2002/0181668 | A1 | 12/2002 | Masoian et al. |
| 2002/0190845 | A1 | 12/2002 | Moore |
| 2003/0007214 | A1 | 1/2003 | Aburakawa et al. |
| 2003/0016418 | A1 | 1/2003 | Westbrook et al. |
| 2003/0045284 | A1 | 3/2003 | Copley et al. |
| 2003/0078074 | A1 | 4/2003 | Sesay et al. |

| | | |
|---|---|---|
| 2003/0141962 A1 | 7/2003 | Barink |
| 2003/0161637 A1 | 8/2003 | Yamamoto et al. |
| 2003/0165287 A1 | 9/2003 | Krill et al. |
| 2003/0174099 A1 | 9/2003 | Bauer et al. |
| 2003/0209601 A1 | 11/2003 | Chung |
| 2004/0001719 A1 | 1/2004 | Sasaki |
| 2004/0008114 A1 | 1/2004 | Sawyer |
| 2004/0017785 A1 | 1/2004 | Zelst |
| 2004/0041714 A1 | 3/2004 | Forster |
| 2004/0043764 A1 | 3/2004 | Bigham et al. |
| 2004/0047313 A1 | 3/2004 | Rumpf et al. |
| 2004/0078151 A1 | 4/2004 | Aljadeff et al. |
| 2004/0100930 A1 | 5/2004 | Shapira et al. |
| 2004/0126068 A1 | 7/2004 | Van Bijsterveld |
| 2004/0146020 A1 | 7/2004 | Kubler et al. |
| 2004/0149736 A1 | 8/2004 | Clothier |
| 2004/0151164 A1 | 8/2004 | Kubler et al. |
| 2004/0151503 A1 | 8/2004 | Kashima et al. |
| 2004/0157623 A1 | 8/2004 | Splett |
| 2004/0160912 A1 | 8/2004 | Kubler et al. |
| 2004/0160913 A1 | 8/2004 | Kubler et al. |
| 2004/0162115 A1 | 8/2004 | Smith et al. |
| 2004/0162116 A1 | 8/2004 | Han et al. |
| 2004/0165573 A1 | 8/2004 | Kubler et al. |
| 2004/0175173 A1 | 9/2004 | Deas |
| 2004/0202257 A1 | 10/2004 | Mehta et al. |
| 2004/0203704 A1* | 10/2004 | Ommodt et al. ............ 455/422.1 |
| 2004/0203846 A1 | 10/2004 | Caronni et al. |
| 2004/0204109 A1 | 10/2004 | Hoppenstein |
| 2004/0208526 A1 | 10/2004 | Mibu |
| 2004/0218873 A1 | 11/2004 | Nagashima et al. |
| 2004/0233877 A1 | 11/2004 | Lee et al. |
| 2004/0258105 A1 | 12/2004 | Spathas et al. |
| 2005/0052287 A1 | 3/2005 | Whitesmith et al. |
| 2005/0058451 A1 | 3/2005 | Ross |
| 2005/0068179 A1 | 3/2005 | Roesner |
| 2005/0076982 A1 | 4/2005 | Metcalf et al. |
| 2005/0078006 A1 | 4/2005 | Hutchins et al. |
| 2005/0093679 A1 | 5/2005 | Zai et al. |
| 2005/0099343 A1 | 5/2005 | Asrani et al. |
| 2005/0116821 A1 | 6/2005 | Wilsey et al. |
| 2005/0141545 A1 | 6/2005 | Fein et al. |
| 2005/0143077 A1 | 6/2005 | Charbonneau |
| 2005/0147071 A1 | 7/2005 | Karaoguz et al. |
| 2005/0148306 A1 | 7/2005 | Hiddink |
| 2005/0159108 A1 | 7/2005 | Fletcher et al. |
| 2005/0174236 A1 | 8/2005 | Brookner |
| 2005/0201761 A1 | 9/2005 | Bartur et al. |
| 2005/0219050 A1 | 10/2005 | Martin |
| 2005/0224585 A1 | 10/2005 | Durrant et al. |
| 2005/0226625 A1* | 10/2005 | Wake et al. .................. 398/115 |
| 2005/0232636 A1 | 10/2005 | Durrant et al. |
| 2005/0242188 A1 | 11/2005 | Vesuna |
| 2005/0252971 A1 | 11/2005 | Howarth et al. |
| 2005/0266797 A1 | 12/2005 | Utsumi et al. |
| 2005/0266854 A1 | 12/2005 | Niiho et al. |
| 2005/0269930 A1 | 12/2005 | Shimizu et al. |
| 2005/0271396 A1 | 12/2005 | Iannelli |
| 2006/0002326 A1 | 1/2006 | Vesuna |
| 2006/0014548 A1 | 1/2006 | Bolin et al. |
| 2006/0017633 A1 | 1/2006 | Pronkine |
| 2006/0045054 A1* | 3/2006 | Utsumi et al. ................ 370/338 |
| 2006/0062579 A1 | 3/2006 | Kim et al. |
| 2006/0094470 A1 | 5/2006 | Wake et al. |
| 2006/0104643 A1 | 5/2006 | Lee et al. |
| 2006/0159388 A1 | 7/2006 | Kawase et al. |
| 2006/0182446 A1 | 8/2006 | Kim et al. |
| 2006/0182449 A1 | 8/2006 | Iannelli et al. |
| 2006/0189354 A1 | 8/2006 | Lee et al. |
| 2006/0233506 A1 | 10/2006 | Noonan et al. |
| 2006/0239630 A1 | 10/2006 | Hase et al. |
| 2006/0274704 A1 | 12/2006 | Desai et al. |
| 2007/0009266 A1 | 1/2007 | Bothwell et al. |
| 2007/0058978 A1 | 3/2007 | Lee et al. |
| 2007/0060045 A1 | 3/2007 | Prautzsch |
| 2007/0060055 A1 | 3/2007 | Desai et al. |
| 2007/0071128 A1 | 3/2007 | Meir et al. |
| 2007/0076649 A1 | 4/2007 | Lin et al. |
| 2007/0093273 A1 | 4/2007 | Cai |
| 2007/0149250 A1 | 6/2007 | Crozzoli et al. |
| 2007/0166042 A1 | 7/2007 | Seeds et al. |
| 2007/0224954 A1 | 9/2007 | Gopi |
| 2007/0248358 A1 | 10/2007 | Sauer |
| 2007/0253714 A1 | 11/2007 | Seeds et al. |
| 2007/0257796 A1 | 11/2007 | Easton et al. |
| 2007/0274279 A1 | 11/2007 | Wood et al. |
| 2007/0297005 A1 | 12/2007 | Montierth et al. |
| 2008/0007453 A1 | 1/2008 | Vassilakis et al. |
| 2008/0013909 A1 | 1/2008 | Kostet et al. |
| 2008/0013956 A1 | 1/2008 | Ware et al. |
| 2008/0013957 A1 | 1/2008 | Akers et al. |
| 2008/0014948 A1 | 1/2008 | Scheinert |
| 2008/0026765 A1 | 1/2008 | Charbonneau |
| 2008/0031628 A1 | 2/2008 | Dragas et al. |
| 2008/0043714 A1 | 2/2008 | Pernu |
| 2008/0056167 A1 | 3/2008 | Kim et al. |
| 2008/0058018 A1 | 3/2008 | Scheinert |
| 2008/0098203 A1 | 4/2008 | Master et al. |
| 2008/0118014 A1 | 5/2008 | Reunamaki et al. |
| 2008/0119198 A1 | 5/2008 | Hettstedt et al. |
| 2008/0124086 A1 | 5/2008 | Matthews |
| 2008/0124087 A1 | 5/2008 | Hartmann et al. |
| 2008/0129634 A1 | 6/2008 | Pera et al. |
| 2008/0134194 A1 | 6/2008 | Liu |
| 2008/0145061 A1 | 6/2008 | Lee et al. |
| 2008/0150514 A1 | 6/2008 | Codreanu et al. |
| 2008/0194226 A1 | 8/2008 | Rivas et al. |
| 2008/0207253 A1 | 8/2008 | Jaakkola et al. |
| 2008/0212969 A1 | 9/2008 | Fasshauer et al. |
| 2008/0219670 A1 | 9/2008 | Kim et al. |
| 2008/0232799 A1 | 9/2008 | Kim |
| 2008/0247716 A1 | 10/2008 | Thomas et al. |
| 2008/0253351 A1 | 10/2008 | Pernu et al. |
| 2008/0253773 A1 | 10/2008 | Zheng |
| 2008/0260388 A1 | 10/2008 | Kim et al. |
| 2008/0261656 A1 | 10/2008 | Bella et al. |
| 2008/0268833 A1 | 10/2008 | Huang et al. |
| 2008/0273844 A1 | 11/2008 | Kewitsch |
| 2008/0279137 A1 | 11/2008 | Pernu et al. |
| 2008/0280569 A1 | 11/2008 | Hazani et al. |
| 2008/0291830 A1 | 11/2008 | Pernu et al. |
| 2008/0292322 A1 | 11/2008 | Daghighian et al. |
| 2008/0298813 A1 | 12/2008 | Song et al. |
| 2008/0304831 A1 | 12/2008 | Miller, II et al. |
| 2008/0310848 A1 | 12/2008 | Yasuda et al. |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0041413 A1 | 2/2009 | Hurley |
| 2009/0047023 A1 | 2/2009 | Pescod et al. |
| 2009/0059903 A1 | 3/2009 | Kubler et al. |
| 2009/0061796 A1 | 3/2009 | Arkko et al. |
| 2009/0061939 A1 | 3/2009 | Andersson et al. |
| 2009/0073916 A1 | 3/2009 | Zhang et al. |
| 2009/0135078 A1 | 5/2009 | Lindmark et al. |
| 2009/0149221 A1 | 6/2009 | Liu et al. |
| 2009/0154621 A1 | 6/2009 | Shapira et al. |
| 2009/0175214 A1 | 7/2009 | Sfar et al. |
| 2009/0180407 A1* | 7/2009 | Sabat et al. .................... 370/280 |
| 2009/0218407 A1 | 9/2009 | Rofougaran |
| 2009/0218657 A1 | 9/2009 | Rofougaran |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0252136 A1 | 10/2009 | Mahany et al. |
| 2009/0252205 A1 | 10/2009 | Rheinfelder et al. |
| 2009/0258652 A1 | 10/2009 | Lambert et al. |
| 2009/0285147 A1 | 11/2009 | Subasic et al. |
| 2009/0316609 A1* | 12/2009 | Singh ........................... 370/280 |
| 2010/0002626 A1 | 1/2010 | Schmidt et al. |
| 2010/0027443 A1 | 2/2010 | LoGalbo et al. |
| 2010/0056200 A1 | 3/2010 | Tolonen |
| 2010/0080154 A1 | 4/2010 | Noh et al. |
| 2010/0080182 A1 | 4/2010 | Kubler et al. |
| 2010/0091475 A1 | 4/2010 | Toms et al. |
| 2010/0118864 A1 | 5/2010 | Kubler et al. |
| 2010/0127937 A1 | 5/2010 | Chandrasekaran et al. |
| 2010/0134257 A1 | 6/2010 | Puleston et al. |

| | | | |
|---|---|---|---|
| 2010/0148373 A1 | 6/2010 | Chandrasekaran | |
| 2010/0156721 A1 | 6/2010 | Alamouti et al. | |
| 2010/0188998 A1 | 7/2010 | Pernu et al. | |
| 2010/0190509 A1 | 7/2010 | Davis | |
| 2010/0202326 A1 | 8/2010 | Rofougaran et al. | |
| 2010/0225413 A1 | 9/2010 | Rofougaran et al. | |
| 2010/0225556 A1 | 9/2010 | Rofougaran et al. | |
| 2010/0225557 A1 | 9/2010 | Rofougaran et al. | |
| 2010/0232323 A1 | 9/2010 | Kubler et al. | |
| 2010/0246558 A1 | 9/2010 | Harel | |
| 2010/0255774 A1 | 10/2010 | Kenington | |
| 2010/0258949 A1 | 10/2010 | Henderson et al. | |
| 2010/0260063 A1 | 10/2010 | Kubler et al. | |
| 2010/0290355 A1 | 11/2010 | Roy et al. | |
| 2010/0309049 A1 | 12/2010 | Reunamäki et al. | |
| 2010/0311472 A1 | 12/2010 | Rofougaran et al. | |
| 2010/0311480 A1 | 12/2010 | Raines et al. | |
| 2010/0329161 A1 | 12/2010 | Ylanen et al. | |
| 2010/0329166 A1 | 12/2010 | Mahany et al. | |
| 2011/0007724 A1 | 1/2011 | Mahany et al. | |
| 2011/0007733 A1 | 1/2011 | Kubler et al. | |
| 2011/0008042 A1* | 1/2011 | Stewart | 398/42 |
| 2011/0021146 A1 | 1/2011 | Pernu | |
| 2011/0021224 A1 | 1/2011 | Koskinen et al. | |
| 2011/0065450 A1 | 3/2011 | Kazmi | |
| 2011/0069668 A1 | 3/2011 | Chion et al. | |
| 2011/0071734 A1 | 3/2011 | Van Wiemeersch et al. | |
| 2011/0086614 A1 | 4/2011 | Brisebois et al. | |
| 2011/0116572 A1 | 5/2011 | Lee et al. | |
| 2011/0126071 A1 | 5/2011 | Han et al. | |
| 2011/0135308 A1* | 6/2011 | Tarlazzi et al. | 398/79 |
| 2011/0149879 A1 | 6/2011 | Noriega et al. | |
| 2011/0158298 A1 | 6/2011 | Djadi et al. | |
| 2011/0182230 A1 | 7/2011 | Ohm et al. | |
| 2011/0194475 A1 | 8/2011 | Kim et al. | |
| 2011/0201368 A1 | 8/2011 | Faccin et al. | |
| 2011/0204504 A1 | 8/2011 | Henderson et al. | |
| 2011/0211439 A1 | 9/2011 | Manpuria et al. | |
| 2011/0215901 A1 | 9/2011 | Van Wiemeersch et al. | |
| 2011/0222415 A1 | 9/2011 | Ramamurthi et al. | |
| 2011/0222434 A1 | 9/2011 | Chen | |
| 2011/0222619 A1 | 9/2011 | Ramamurthi et al. | |
| 2011/0227678 A1* | 9/2011 | Cruickshank et al. | 335/296 |
| 2011/0227795 A1 | 9/2011 | Lopez et al. | |
| 2011/0244887 A1 | 10/2011 | Dupray et al. | |
| 2011/0256878 A1 | 10/2011 | Zhu et al. | |
| 2011/0268033 A1 | 11/2011 | Boldi et al. | |
| 2011/0274021 A1 | 11/2011 | He et al. | |
| 2011/0281536 A1 | 11/2011 | Lee et al. | |

FOREIGN PATENT DOCUMENTS

| | | |
|---|---|---|
| CA | 2065090 C | 2/1998 |
| CA | 2242707 C | 9/2002 |
| DE | 20104862 U1 | 9/2001 |
| DE | 10249414 A1 | 5/2004 |
| EP | 0477952 A2 | 4/1992 |
| EP | 0477952 A3 | 11/1993 |
| EP | 0461583 B1 | 3/1997 |
| EP | 0687400 B1 | 11/1998 |
| EP | 0993124 A2 | 4/2000 |
| EP | 1173034 A1 | 1/2002 |
| EP | 1202475 A2 | 5/2002 |
| EP | 1267447 A1 | 12/2002 |
| EP | 0993124 A3 | 4/2003 |
| EP | 1347584 A2 | 9/2003 |
| EP | 1363352 A1 | 11/2003 |
| EP | 1391897 A1 | 2/2004 |
| EP | 1443687 A1 | 8/2004 |
| EP | 1455550 A2 | 9/2004 |
| EP | 1501206 A1 | 1/2005 |
| EP | 1503451 A1 | 2/2005 |
| EP | 1530316 A1 | 5/2005 |
| EP | 1511203 B1 | 3/2006 |
| EP | 1267447 B1 | 8/2006 |
| EP | 1693974 A1 | 8/2006 |
| EP | 1742388 A1 | 1/2007 |
| EP | 1173034 B1 | 7/2007 |
| EP | 1227605 B1 | 1/2008 |
| EP | 1954019 A1 | 8/2008 |
| EP | 1968250 A1 | 9/2008 |
| EP | 1056226 B1 | 4/2009 |
| EP | 1357683 B1 | 5/2009 |
| GB | 2323252 A | 9/1998 |
| GB | 2399963 A | 9/2004 |
| GB | 2428149 A | 1/2007 |
| JP | 05260018 | 10/1993 |
| JP | 09083450 | 3/1997 |
| JP | 09162810 | 6/1997 |
| JP | 09200840 A | 7/1997 |
| JP | 11068675 | 3/1999 |
| JP | 2000152300 | 5/2000 |
| JP | 2000341744 | 12/2000 |
| JP | 2002264617 | 9/2002 |
| JP | 2003148653 | 5/2003 |
| JP | 2003172827 | 6/2003 |
| JP | 2004172734 | 6/2004 |
| JP | 2004245963 | 9/2004 |
| JP | 2004247090 | 9/2004 |
| JP | 2004264901 | 9/2004 |
| JP | 2004265624 | 9/2004 |
| JP | 2004317737 | 11/2004 |
| JP | 2004349184 | 12/2004 |
| JP | 2005018175 | 1/2005 |
| JP | 2005087135 | 4/2005 |
| JP | 2005134125 | 5/2005 |
| JP | 2007228603 | 9/2007 |
| JP | 2008172597 | 7/2008 |
| WO | 9603823 A1 | 2/1996 |
| WO | 0042721 A1 | 7/2000 |
| WO | 0178434 A1 | 10/2001 |
| WO | 0184760 A1 | 11/2001 |
| WO | 0221183 A1 | 3/2002 |
| WO | 0230141 A1 | 4/2002 |
| WO | 02102102 A1 | 12/2002 |
| WO | 03024027 A1 | 3/2003 |
| WO | 03098175 A1 | 11/2003 |
| WO | 2004030154 A2 | 4/2004 |
| WO | 2004047472 A1 | 6/2004 |
| WO | 2004056019 A1 | 7/2004 |
| WO | 2004059934 A1 | 7/2004 |
| WO | 2004086795 A2 | 10/2004 |
| WO | 2004093471 A2 | 10/2004 |
| WO | 2005069203 A3 | 1/2005 |
| WO | 2005062505 A1 | 7/2005 |
| WO | 2005069203 A2 | 7/2005 |
| WO | 2005073897 A1 | 8/2005 |
| WO | 2005079386 A2 | 9/2005 |
| WO | 2005101701 A2 | 10/2005 |
| WO | 2005111959 A2 | 11/2005 |
| WO | 2006011778 A1 | 2/2006 |
| WO | 2006018592 A1 | 2/2006 |
| WO | 2006019392 A1 | 2/2006 |
| WO | 2006039941 A1 | 4/2006 |
| WO | 2006046088 A1 | 5/2006 |
| WO | 2006051262 A1 | 5/2006 |
| WO | 2006133609 A1 | 12/2006 |
| WO | 2006136811 A1 | 12/2006 |
| WO | 2007048427 A1 | 5/2007 |
| WO | 2007077451 A1 | 7/2007 |
| WO | 2007088561 A1 | 8/2007 |
| WO | 2007091026 A1 | 8/2007 |
| WO | 2008008249 A2 | 1/2008 |
| WO | 2008027213 A2 | 3/2008 |
| WO | 2008033298 A2 | 3/2008 |
| WO | 2008039830 A2 | 4/2008 |
| WO | 2010090999 A1 | 8/2010 |

OTHER PUBLICATIONS

Bakaul, M., et al., "Efficient Multiplexing Scheme for Wavelength-Interleaved DWDM Millimeter-Wave Fiber-Radio Systems," IEEE Photonics Technology Letters, vol. 17, No. 12, Dec. 2005.

Huang, C., et al., "A WLAN-Used Helical Antenna Fully Integrated with the PCMCIA Carrier," IEEE Trans. Ant. and Prop., vol. 53, No. 12, pp. 4164-4168, Dec. 2005.

Gibson, et al., "Evanescent Field Analysis of Air-Silica Microstructure Waveguides," IEEE, 1-7803-7104-4/01, 2001, pp. 709-710.

International Search Report mailed Mar. 7, 2008 for PCT/US07/21041 (1170-035-WO), 3 pages.

No Author, International Telecommunication Union, ITU-T G.652, Telecommunication Standardization Sector of ITU, Jun. 2005, Series G: Transmission Systems and Media, Digital Systems and Networks, Transmission Media and Optical Systems Characteristics—Optical Fibre Cables, Characteristics of a Single-Mode Optical Fiber abd Cable, ITU-T Recommendation G.652, 22 pages.

No Author, International Telecommunication Union, ITU-T G.657, Telecommunication Standardization Sector of ITU, Dec. 2006, Series G: Transmission Systems and Media, Digital Systems and Networks, Transmission Media and Optical Systems Characteristics—Optical Fibre Cables, Characteristics of a Bending Loss Insensitive Single Mode Optical Fibre and Cable for the Access Network, ITU-T Recommendation G.657, 20 pages.

Kojucharow, K., et al., "Millimeter-Wave Signal Properties Resulting from Electrooptical Upconversion," IEEE Transaction on Microwave Theory and Techniques, vol. 49, No. 10, Oct. 2001, pp. 1977-1985.

Monro, et al., "Holey Fibers with Random Cladding Distributions," Optics Letters, vol. 25, No. 4, Feb. 15, 2000.

Moreira, J.D., et al., "Diversity Techniques for OFDM Based WLAN Systems," pp. 1008-1011, PIMRC 2002 IEEE.

Niiho, T., et al., "Multi-Channel Wireless LAN Distributed Antenna System Based on Radio-Over-Fiber Techniques," Lasers and Electro-Optics Society 2004, LEOS 2004, The 17th Annual Meeting of the IEEE, vol. 1, Nov. 7-11, 2004, pp. 57-58, vol. 1.

Paulraj, A., et al., "An Overview of MIMO Communications—A Key to Gigabit Wireless," Proceedings of the IEEE, vol. 92, No. 2, Feb. 2004.

Pickrell, et al., "Novel Techniques for the Fabrication of Holey Optical Fibers," Spie Conference Proceedings, vol. 4578, pp. 271-282, 2001.

No Author, RFID Technology Overview, 11 pages, 2004.

Roh, W., et al., "MIMO Channel Capacity for the Disctributed Antenna Systems," Vehicular Technology Conference, 2002, proceedings, VTC 2002-Fall, 2002 IEEE 56th, vol. 2, Sep. 24-28, 2002, pp. 706-709, vol. 2.

Seto, I., et al., M., "An Antenna-Selective Trasmit Diversity Technique for OFDM-Based WLANs with Dual-Band Printed Antennas," pp. 51-56, IEEE Communications Society/WCNC 2005.

Shen, C., et al., "Comparison of Channel Capacity for MIMO-DAS versus MIMO-CAS," Communications, 2003, APCC 2003, The 9th Asia-Pacific Conference, vol. 1, Sep. 21-24, 2003, pp. 113-118, vol. 1.

Wake, D. et al., "Passive Picocell: A New Concept n Wireless Network Infrastructure," Electronics Letters, vol. 33, No. 5, Feb. 27, 1997, pp. 404-406.

Winters, J., et al., "The Impact of Antenna Diversity on the Capacity of Wireless Communications Systems," IEEE Transcations on Communications, vol. 42, No. 2/3/4, Feb./Mar./Apr. 1994.

Opatic, D., "Radio over Fiber Technology for Wireless Access," Oct. 17, 2009, 6 pages.

\* cited by examiner

SECTORIZATION IN DISTRIBUTED ANTENNA SYSTEMS, AND RELATED COMPONENTS AND METHODS

RELATED APPLICATIONS

The present application is related to U.S. Provisional Patent Application Ser. No. 61/330,383 filed on May 2, 2010 and entitled "Optical Fiber-Based Distributed Communications Systems, and Related Components and Methods," which is incorporated herein by reference in its entirety.

The present application is also related to U.S. Provisional Patent Application Ser. No. 61/230,463 filed on Jul. 31, 2009 and entitled "Optical Fiber-Based Distributed Antenna Systems, Components, and Related Methods for Calibration Thereof," which is incorporated herein by reference in its entirety.

The present application is also related to U.S. Provisional Patent Application Ser. No. 61/230,472 filed on Jul. 31, 2009 and entitled "Optical Fiber-Based Distributed Antenna Systems, Components, and Related Methods for Monitoring the Status Thereof," which is incorporated herein by reference in its entirety.

BACKGROUND

1. Field of the Disclosure

The technology of the disclosure relates to distributed antenna systems for distributing radio frequency (RF) signals to remote antenna units.

2. Technical Background

Wireless communication is rapidly growing, with ever-increasing demands for high-speed mobile data communication. As an example, so-called "wireless fidelity" or "WiFi" systems and wireless local area networks (WLANs) are being deployed in many different types of areas (e.g., coffee shops, airports, libraries, etc.). Distributed antenna systems communicate with wireless devices called "clients," which must reside within the wireless range or "cell coverage area" in order to communicate with an access point device.

One approach to deploying a distributed antenna system involves the use of radio frequency (RF) antenna coverage areas, also referred to as "antenna coverage areas." The antenna coverage areas are provided by remote antenna units in the distributed antenna system. Remote antenna units can provide antenna coverage areas having radii in the range from a few meters up to twenty (20) meters as an example. If the antenna coverage areas provided each cover a small area, there are typically only a few users (clients) per antenna coverage area. This allows for minimizing the amount of RF bandwidth shared among the wireless system users. It may be desirable to provide antenna coverage areas in a building or other facility to provide indoor distributed antenna system access to clients within the building or facility. It may also be desirable to employ optical fiber to distribute RF communications signals to provide an optical fiber-based distributed antenna system. Distribution of RF communications signals over optical fiber can include Radio-over-Fiber (RoF) distribution. Benefits of optical fiber include increased bandwidth.

Remote antenna units in a distributed antenna system can be configured to distribute RF communication signals in multiple radio bands (i.e., frequencies or ranges of frequencies), as opposed to a single radio band. Distributing RF communications signals in multiple radio bands in an antenna coverage area increases flexibility of the distributed antenna system. In this scenario, client devices configured to communicate in different radio bands can be supported in a given antenna coverage area provided by the remote antenna unit. However, providing remote antenna units that support multiple radio bands can also limit capacity in the distributed antenna system. The bandwidth of the remote antenna unit is split among the multiple radio bands thus reducing the capacity of each supported radio band in a given antenna coverage area.

To offset a reduction in capacity in remote antenna units supporting multiple radio bands, additional remote antenna units could be provided. The remote antenna units could be co-located and each configured to support only one of the radio bands. However, providing additional remote antenna units increases the cost of the distributed antenna system. Further, additional head-end equipment may be required to be deployed to support the additional remote antenna units. Providing additional remote antenna units to provide additional capacity may be delayed after initial installation and provided as needed, but higher installation costs may be associated with retrofitting an existing installation with additional remote antenna units.

SUMMARY OF THE DETAILED DESCRIPTION

Embodiments disclosed in the detailed description include providing sectorization in distributed antenna systems, and related components and methods. As one non-limiting example, the distributed antenna systems may be optical fiber-based distributed antenna systems. The antenna units in the distributed antenna systems can be sectorized. In this regard, one or more radio bands distributed by the distributed antenna systems can be allocated to one or more sectors. The antenna units in the distributed antenna systems are also allocated to one or more sectors. In this manner, only radio frequency (RF) communications signals in the radio band(s) allocated to given sector(s) are distributed to the antenna unit allocated to the same sector(s). The bandwidth capacity of the antenna unit is split among the radio band(s) allocated to sector(s) allocated to the antenna unit. The sectorization of the radio band(s) and the antenna units can be configured and/or altered based on capacity needs for given radio bands in antenna coverage areas provide by the antenna units.

In one embodiment, a head-end apparatus or equipment configured to distribute radio bands in one or more sectors among a plurality of sectors in a distributed antenna system is provided. The head end equipment includes a plurality of radio interfaces each configured to split a received downlink electrical RF communications signal into a plurality of downlink electrical RF communications signals. Each of the plurality of radio interfaces is also configured to control providing each of the split plurality of downlink electrical RF communications signals to one or more sectors among a plurality of sectors in a distributed antenna system configured for the radio interface. A plurality of optical interfaces is also provided and each configured to receive the split plurality of downlink electrical RF communications signals from the plurality of radio interfaces. Each of the plurality of optical interfaces is also configured to control for which sectors among the plurality of sectors configured for the optical interface the received split plurality of downlink electrical RF communications signals are provided to one or more remote antenna units (RAUs) communicatively coupled to the optical interface. Each of the plurality of optical interfaces is also configured to convert the received split plurality of downlink electrical RF communications signals into a plurality of downlink optical RF communications signals.

The head end equipment may also include components to sectorize uplink RF communications signals as well. In this regard, in another embodiment, each of the plurality of optical interfaces provided in the head end equipment is further configured to split a received uplink optical RF communications signal into a plurality of uplink optical RF communications signals. Each of the plurality of optical interfaces is also configured to control providing each of the split plurality of uplink optical RF communications signals to the one or more sectors among a plurality of sectors configured for the optical interface. Each of the plurality of optical interfaces is also configured to convert the received split plurality of uplink optical RF communications signals into a plurality of uplink electrical RF communications signals. Each of the plurality of radio interfaces provided in the head end equipment is further configured to receive the plurality of uplink electrical RF communications signals from the plurality of optical interfaces. Each of the plurality of radio interfaces is also configured to control for which sectors among the plurality of sectors configured for the radio interface the received plurality of uplink electrical RF communications signals are provided to one or more carriers communicatively coupled to the radio interface.

In another embodiment, a method of distributing radio bands in one or more sectors among a plurality of sectors in a distributed antenna system is provided. The method includes splitting a received downlink electrical RF communications signal into a plurality of downlink electrical RF communications signals. The method also includes providing each of the split plurality of downlink electrical RF communications signals to one or more sectors among a plurality of sectors in a distributed antenna system. The method also includes receiving the split plurality of downlink electrical RF communications signals. The method also includes controlling for which sectors among the plurality of sectors the received split plurality of downlink electrical RF communications signals are provided to one or more RAUs communicatively. The method also includes converting the received split plurality of downlink electrical RF communications signals into a plurality of downlink optical RF communications signals.

In another embodiment, a radio interface configured to distribute radio bands in unique sectors among a plurality of sectors in a distributed antenna system is provided. The radio interface includes a downlink interface configured to receive a downlink RF communications signal. The radio interface also includes a downlink splitter configured to split the downlink RF communications signal into a plurality of downlink RF communications signals. The radio interface also includes a plurality of downlink sector switches each assigned to a unique sector among a plurality of sectors in a distributed antenna system. Each of the plurality of downlink sector switches is configured to receive a downlink RF communications signal among the plurality of downlink RF communications signals from the downlink splitter, and control whether the received downlink RF communications signal is distributed to the unique sector assigned to the sector switch. The radio interface may also include components to sectorize uplink RF communications signals as well.

In another embodiment, an optical interface configured to distribute radio bands in unique sectors among a plurality of sectors in a distributed antenna system is provided. The optical interface includes a downlink interface configured to receive a plurality of downlink electrical RF communications signals each assigned to a unique sector among a plurality of sectors in a distributed antenna system. The optical interface also includes a plurality of downlink sector switches each assigned to a unique sector in the distributed antenna system. Each of the plurality of downlink sector switches is configured to receive a downlink electrical RF communications signal among the plurality of downlink electrical RF communications signals for the unique sector assigned to the sector switch. Each of the plurality of downlink sector switches is also configured to control whether the received downlink electrical RF communications signal is distributed to the unique sector assigned to the sector switch. A plurality of downlink electrical-to-optical (E/O) converters are provided in the optical interface and each configured to receive the downlink electrical RF communications signal from a sector switch among the plurality of sector switches, and convert the received downlink electrical RF communications signal into a downlink optical RF communications signal. The optical interface may also include components to sectorize uplink RF communications signals as well.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed in the detailed description include providing sectorization in distributed antenna systems, and related components and methods. As one non-limiting example, the distributed antenna systems may be optical fiber-based distributed antenna systems. The antenna units in the distributed antenna systems can be sectorized. In this regard, one or more radio bands distributed by the distributed antenna systems can be allocated to one or more sectors. The antenna units in the distributed antenna systems are also allocated to one or more sectors. In this manner, only radio frequency (RF) communications signals in the radio band(s) allocated to given sector(s) are distributed to the antenna unit allocated to the same sector(s). The bandwidth capacity of the antenna unit is split among the radio band(s) allocated to sector(s) allocated to the antenna unit. The sectorization of the radio band(s) and the antenna units can be configured and/or altered based on capacity needs for given radio bands in antenna coverage areas provide by the antenna units.

Figure 1:
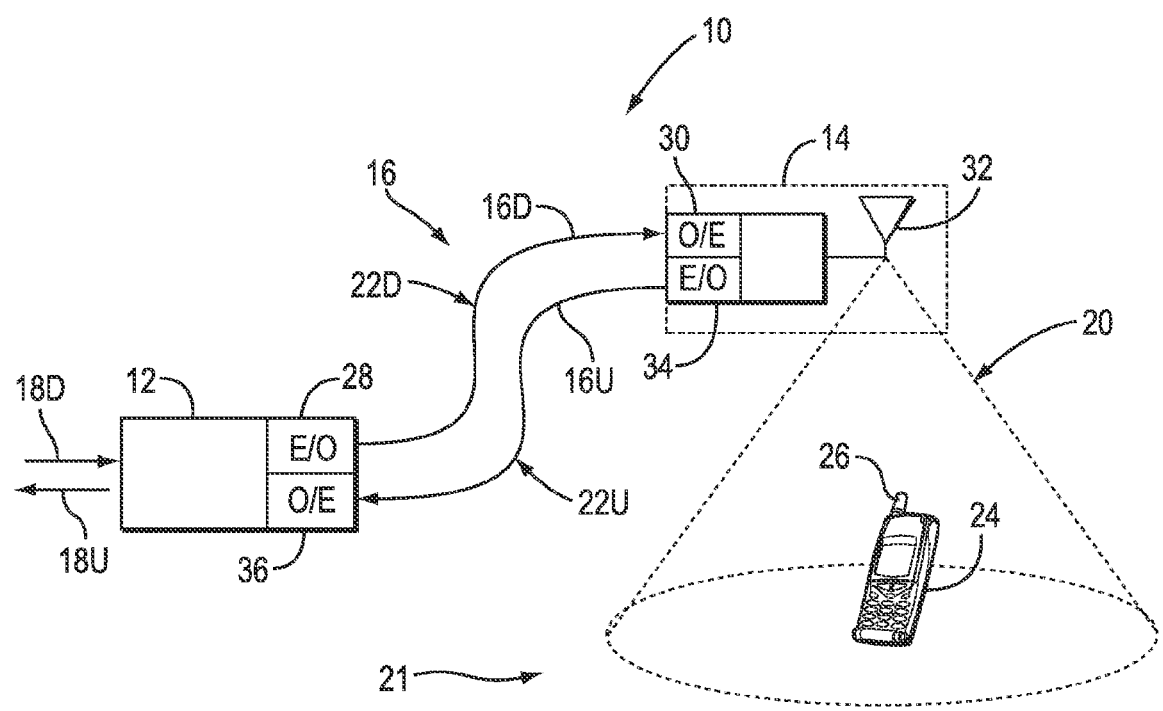
FIG. 1 is a schematic diagram of an exemplary optical fiber-based distributed antenna system.
Figure 2:
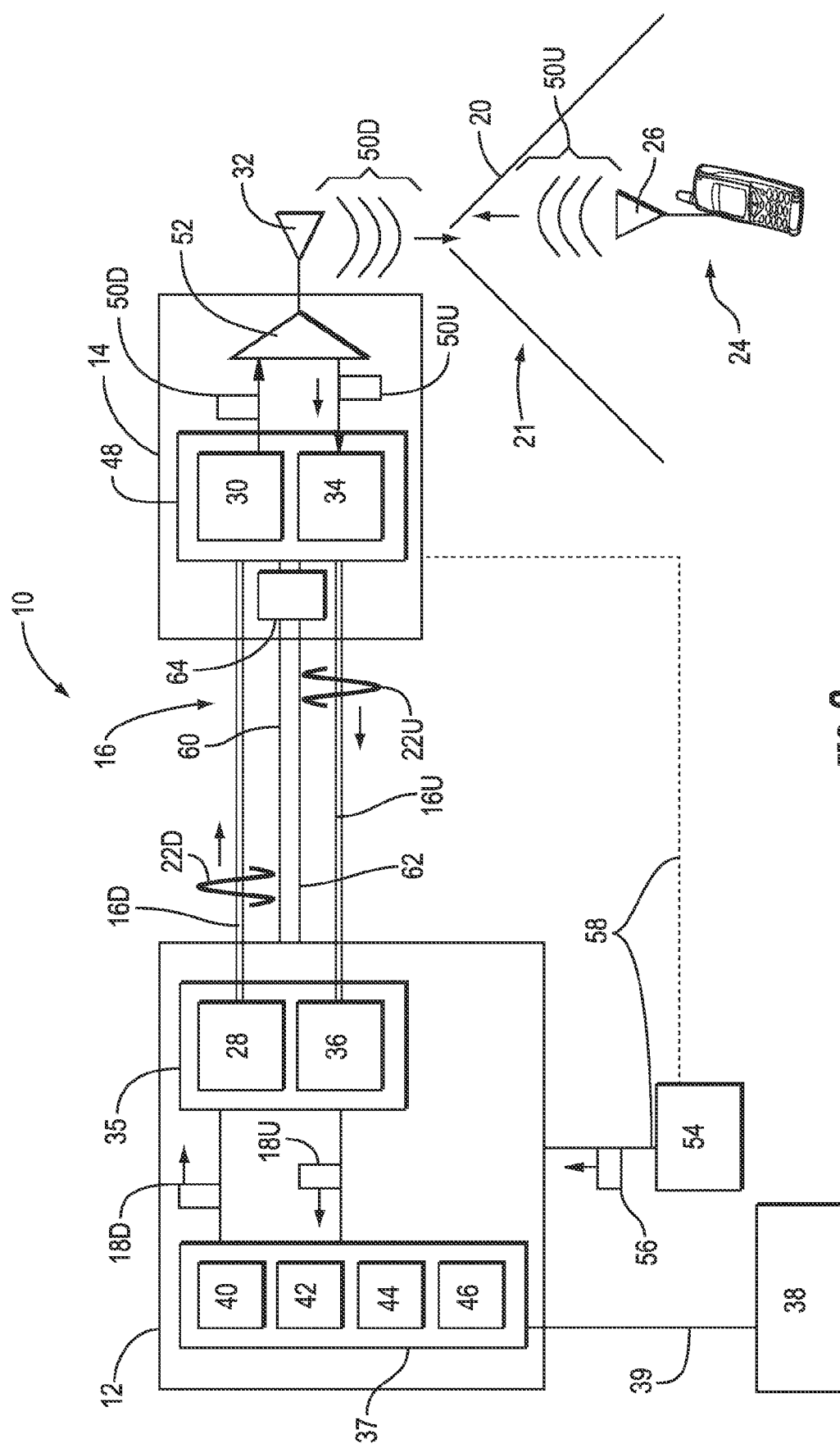
FIG. 2 is a more detailed schematic diagram of exemplary head end equipment and a remote antenna unit (RAU) that can be deployed in the optical fiber-based distributed antenna system of FIG. 1.
Figure 3:
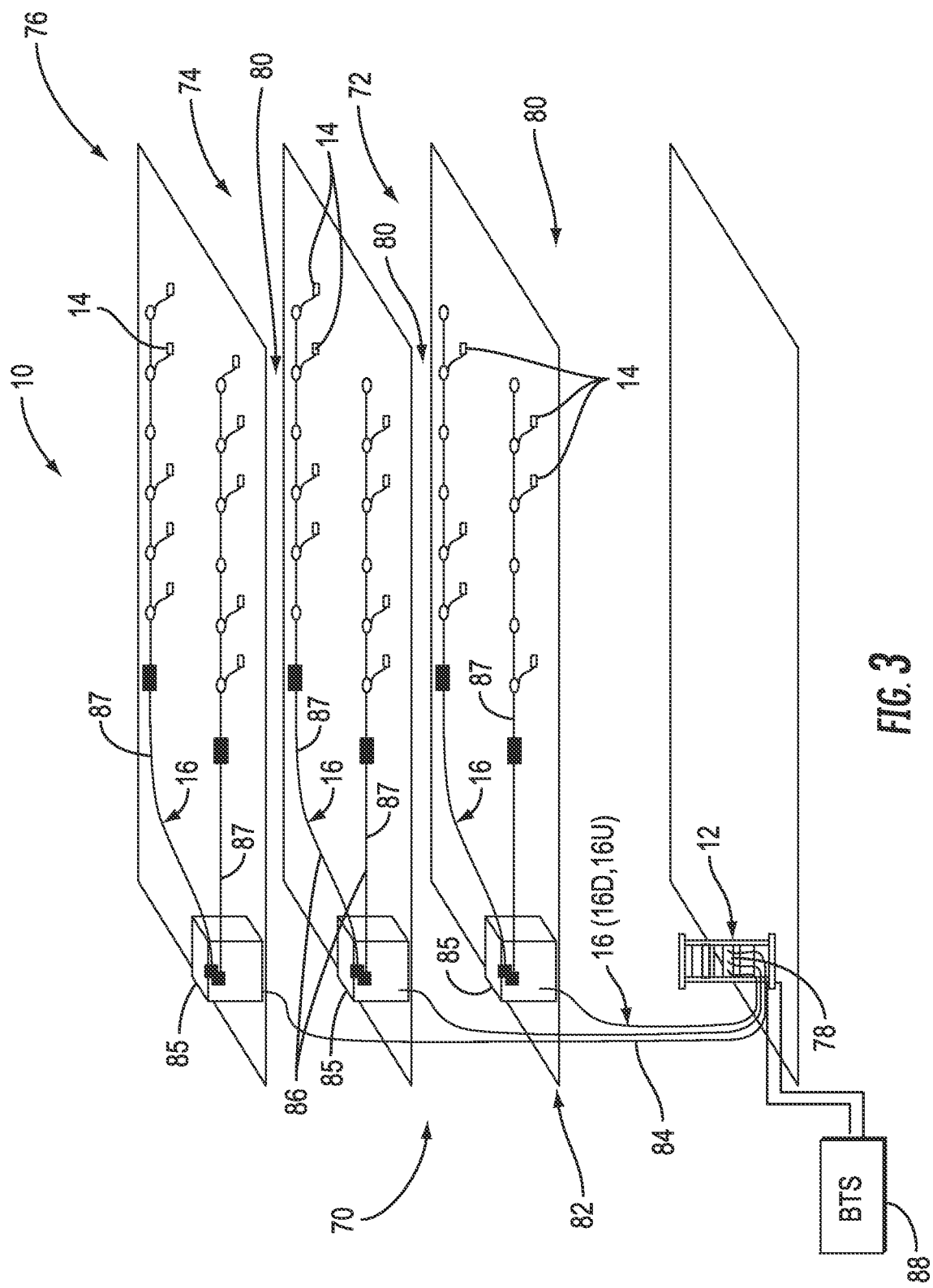
FIG. 3 is a partially schematic cut-away diagram of an exemplary building infrastructure in which the optical fiber-based distributed antenna system in FIG. 1 can be employed.

Before discussing distributed antenna systems and related components and methods that support sectorization starting at FIG. 4, FIGS. 1-3 are provided and first discussed below. FIGS. 1-3 provide examples of distributed antenna systems that do not include sectorization support, but can be configured to provide sectorization support, including according to the embodiments described herein.

FIG. 1 is a schematic diagram of an embodiment of an optical fiber-based distributed antenna system. In this embodiment, the system is an optical fiber-based distributed antenna system 10 that is configured to create one or more antenna coverage areas for establishing communications with wireless client devices located in the RF range of the antenna coverage areas. The optical fiber-based distributed antenna system 10 provides RF communications services (e.g., cellular services). In this embodiment, the optical fiber-based distributed antenna system 10 includes head end equipment in the form of a head-end unit (HEU) 12, one or more remote antenna units (RAUs) 14, and an optical fiber 16 that optically couples the HEU 12 to the RAU 14 in this example. The HEU 12 is configured to receive communications over downlink electrical RF communications signals 18D from a source or sources, such as a network or carrier as examples, and provide such communications to the RAU 14. The HEU 12 is also configured to return communications received from the RAU 14, via uplink electrical RF communications signals 18U, back to the source or sources. In this regard in this embodiment, the optical fiber 16 includes at least one downlink optical fiber 16D to carry signals communicated from the HEU 12 to the RAU 14 and at least one uplink optical fiber 16U to carry signals communicated from the RAU 14 back to the HEU 12. One downlink optical fiber 16D and one uplink optical fiber 16U could be provided to support multiple channels each using wavelength-division multiplexing (WDM), as discussed in U.S. patent application Ser. No. 12/892,424 entitled "Providing Digital Data Services in Optical Fiber-Based Distributed Radio Frequency (RF) Communications Systems, And Related Components and Methods," incorporated herein by reference in its entirety. Other options for WDM and frequency-division multiplexing (FDM) are also disclosed in U.S. patent application Ser. No. 12/892,424, any of which can be employed in any of the embodiments disclosed herein.

The optical fiber-based distributed antenna system 10 has an antenna coverage area 20 that can be substantially centered about the RAU 14. The antenna coverage area 20 of the RAU 14 forms an RF coverage area 21. The HEU 12 is adapted to perform or to facilitate any one of a number of wireless applications, including but not limited to Radio-over-Fiber (RoF), radio frequency identification (RFID), wireless local-area network (WLAN) communication, public safety, cellular, telemetry, and other mobile or fixed services. Shown within the antenna coverage area 20 is a client device 24 in the form of a mobile device as an example, which may be a cellular telephone as an example. The client device 24 can be any device that is capable of receiving RF communication signals. The client device 24 includes an antenna 26 (e.g., a wireless card) adapted to receive and/or send electromagnetic RF communications signals.

With continuing reference to FIG. 1, to communicate the electrical RF communications signals over the downlink optical fiber 16D to the RAU 14, to in turn be communicated to the client device 24 in the antenna coverage area 20 formed by the RAU 14, the HEU 12 includes an electrical-to-optical (E/O) converter 28. The E/O converter 28 converts the downlink electrical RF communications signals 18D to downlink optical RF communications signals 22D to be communicated over the downlink optical fiber 16D. The RAU 14 includes an optical-to-electrical (O/E) converter 30 to convert received downlink optical RF communications signals 22D back to electrical RF communications signals to be communicated wirelessly through an antenna 32 of the RAU 14 to client devices 24 located in the antenna coverage area 20.

Similarly, the antenna 32 is also configured to receive wireless RF communications from client devices 24 in the antenna coverage area 20. In this regard, the antenna 32 receives wireless RF communications from client devices 24 and communicates electrical RF communications signals representing the wireless RF communications to an E/O converter 34 in the RAU 14. The E/O converter 34 converts the electrical RF communications signals into uplink optical RF communications signals 22U to be communicated over the uplink optical fiber 16U. An O/E converter 36 provided in the HEU 12 converts the uplink optical RF communications signals 22U into uplink electrical RF communications signals, which can then be communicated as uplink electrical RF communications signals 18U back to a network or other source. The HEU 12 in this embodiment is not able to distinguish the location of the client devices 24 in this embodiment. The client device 24 could be in the range of any antenna coverage area 20 formed by an RAU 14.

FIG. 2 is a more detailed schematic diagram of the exemplary optical fiber-based distributed antenna system 10 of FIG. 1 that provides electrical RF service signals for a particular RF service or application. In an exemplary embodiment, the HEU 12 includes a service unit 37 that provides electrical RF service signals by passing (or conditioning and then passing) such signals from one or more outside networks 38 via a network link 39. In a particular example embodiment, this includes providing WLAN signal distribution as specified in the Institute of Electrical and Electronics Engineers (IEEE) 802.11 standard, i.e., in the frequency range from 2.4 to 2.5 GigaHertz (GHz) and from 5.0 to 6.0 GHz. Any other electrical RF communications signal frequencies are possible. In another exemplary embodiment, the service unit 37 provides electrical RF service signals by generating the signals directly. In another exemplary embodiment, the service unit 37 coordinates the delivery of the electrical RF service signals between client devices 24 within the antenna coverage area 20.

With continuing reference to FIG. 2, the service unit 37 is electrically coupled to the E/O converter 28 that receives the downlink electrical RF communications signals 18D from the service unit 37 and converts them to corresponding downlink optical RF communications signals 22D. In an exemplary embodiment, the E/O converter 28 includes a laser suitable for delivering sufficient dynamic range for the RoF applications described herein, and optionally includes a laser driver/amplifier electrically coupled to the laser. Examples of suitable lasers for the E/O converter 28 include, but are not limited to, laser diodes, distributed feedback (DFB) lasers, Fabry-Perot (FP) lasers, and vertical cavity surface emitting lasers (VCSELs).

With continuing reference to FIG. 2, the HEU 12 also includes the O/E converter 36, which is electrically coupled to the service unit 37. The O/E converter 36 receives the uplink optical RF communications signals 22U and converts them to corresponding uplink electrical RF communications signals 18U. In an example embodiment, the O/E converter 36 is a photodetector, or a photodetector electrically coupled to a linear amplifier. The E/O converter 28 and the O/E converter 36 constitute a "converter pair" 35, as illustrated in FIG. 2.

In accordance with an exemplary embodiment, the service unit 37 in the HEU 12 can include an RF communications signal conditioner unit 40 for conditioning the downlink electrical RF communications signals 18D and the uplink electrical RF communications signals 18U, respectively. The service unit 37 can include a digital signal processing unit ("digital signal processor") 42 for providing to the RF communications signal conditioner unit 40 an electrical signal that is modulated onto an RF carrier to generate a desired downlink electrical RF communications signal 18D. The digital signal processor 42 is also configured to process a demodulation signal provided by the demodulation of the uplink electrical RF communications signal 18U by the RF communications signal conditioner unit 40. The service unit 37 in the HEU 12 can also include an optional central processing unit (CPU) 44 for processing data and otherwise performing logic and computing operations, and a memory unit 46 for storing data, such as data to be transmitted over a WLAN or other network for example.

With continuing reference to FIG. 2, the RAU 14 also includes a converter pair 48 comprising the O/E converter 30 and the E/O converter 34. The O/E converter 30 converts the received downlink optical RF communications signals 22D from the HEU 12 back into downlink electrical RF communications signals 50D. The E/O converter 34 converts uplink electrical RF communications signals 50U received from the client device 24 into the uplink optical RF communications signals 22U to be communicated to the HEU 12. The O/E converter 30 and the E/O converter 34 are electrically coupled to the antenna 32 via an RF signal-directing element 52, such as a circulator for example. The RF signal-directing element 52 serves to direct the downlink electrical RF communications signals 50D and the uplink electrical RF communications signals 50U, as discussed below. In accordance with an exemplary embodiment, the antenna 32 can include one or more patch antennas, such as disclosed in U.S. patent application Ser. No. 11/504,999, filed Aug. 16, 2006 entitled "Radio-over-Fiber Transponder With A Dual-Band Patch Antenna System," and U.S. patent application Ser. No. 11/451,553, filed Jun. 12, 2006 entitled "Centralized Optical Fiber-based Wireless Picocellular Systems and Methods," both of which are incorporated herein by reference in their entireties.

With continuing reference to FIG. 2, the optical fiber-based distributed antenna system 10 also includes a power supply 54 that generates an electrical power signal 56. The power supply 54 is electrically coupled to the HEU 12 for powering the power-consuming elements therein. In an exemplary embodiment, an electrical power line 58 runs through the HEU 12 and over to the RAU 14 to power the O/E converter 30 and the E/O converter 34 in the converter pair 48, the optional RF signal-directing element 52 (unless the RF signal-directing element 52 is a passive device such as a circulator for example), and any other power-consuming elements provided. In an exemplary embodiment, the electrical power line 58 includes two wires 60 and 62 that carry a single voltage and that are electrically coupled to a DC power converter 64 at the RAU 14. The DC power converter 64 is electrically coupled to the O/E converter 30 and the E/O converter 34 in the converter pair 48, and changes the voltage or levels of the electrical power signal 56 to the power level(s) required by the power-consuming components in the RAU 14. In an exemplary embodiment, the DC power converter 64 is either a DC/DC power converter or an AC/DC power converter, depending on the type of electrical power signal 56 carried by the electrical power line 58. In another example embodiment, the electrical power line 58 (dashed line) runs directly from the power supply 54 to the RAU 14 rather than from or through the HEU 12. In another example embodiment, the electrical power line 58 includes more than two wires and carries multiple voltages.

To provide further exemplary illustration of how an optical fiber-based distributed antenna system can be deployed indoors, FIG. 3 is provided. FIG. 3 is a partially schematic cut-away diagram of a building infrastructure 70 employing an optical fiber-based distributed antenna system. The system may be the optical fiber-based distributed antenna system 10 of FIGS. 1 and 2. The building infrastructure 70 generally represents any type of building in which the optical fiber-based distributed antenna system 10 can be deployed. As previously discussed with regard to FIGS. 1 and 2, the optical fiber-based distributed antenna system 10 incorporates the HEU 12 to provide various types of communication services to coverage areas within the building infrastructure 70, as an example. For example, as discussed in more detail below, the optical fiber-based distributed antenna system 10 in this embodiment is configured to receive wireless RF communications signals and convert the RF communications signals into RoF signals to be communicated over the optical fiber 16 to multiple RAUs 14. The optical fiber-based distributed antenna system 10 in this embodiment can be, for example, an indoor distributed antenna system (IDAS) to provide wireless service inside the building infrastructure 70. These wireless signals can include, but are not limited to, cellular service, wireless services such as RFID tracking, Wireless Fidelity (WiFi), local area network (LAN), WLAN, and combinations thereof, as examples.

With continuing reference to FIG. 3, the building infrastructure 70 in this embodiment includes a first (ground) floor 72, a second floor 74, and a third floor 76. The floors 72, 74, 76 are serviced by the HEU 12 through a main distribution frame 78 to provide antenna coverage areas 80 in the building infrastructure 70. Only the ceilings of the floors 72, 74, 76 are shown in FIG. 3 for simplicity of illustration. In the example embodiment, a main cable 82 has a number of different sections that facilitate the placement of a large number of RAUs 14 in the building infrastructure 70. Each RAU 14 in turn services its own coverage area in the antenna coverage areas 80. The main cable 82 can include, for example, a riser cable 84 that carries all of the downlink and uplink optical fibers 16D, 16U to and from the HEU 12. The riser cable 84 may be routed through an interconnect unit (ICU) 85. The ICU 85 may be provided as part of or separate from the power supply 54 in FIG. 2. The ICU 85 may also be configured to provide power to the RAUs 14 via the electrical power line 58, as illustrated in FIG. 2 and discussed above, provided inside an array cable 87, or tail cable or home-run tether cable as other examples, and distributed with the downlink and uplink optical fibers 16D, 16U to the RAUs 14. The main cable 82 can include one or more multi-cable (MC) connectors adapted to connect select downlink and uplink optical fibers 16D, 16U, along with an electrical power line, to a number of optical fiber cables 86.

The main cable 82 enables the multiple optical fiber cables 86 to be distributed throughout the building infrastructure 70 (e.g., fixed to the ceilings or other support surfaces of each floor 72, 74, 76) to provide the antenna coverage areas 80 for the first, second and third floors 72, 74 and 76. In an example embodiment, the HEU 12 is located within the building infrastructure 70 (e.g., in a closet or control room), while in another example embodiment, the HEU 12 may be located outside of the building infrastructure 70 at a remote location. A base transceiver station (BTS) 88, which may be provided by a second party such as a cellular service provider, is connected to the HEU 12, and can be co-located or located remotely from the HEU 12. A BTS is any station or source that provides an input signal to the HEU 12 and can receive a return signal from the HEU 12. In a typical cellular system, for example, a plurality of BTSs are deployed at a plurality of remote locations to provide wireless telephone coverage. Each BTS serves a corresponding cell and when a mobile station enters the cell, the BTS communicates with the mobile station. Each BTS can include at least one radio transceiver for enabling communication with one or more subscriber units operating within the associated cell. Alternatively, radio input could be provided by a repeater or picocell as other examples.

The optical fiber-based distributed antenna system 10 in FIGS. 1-3 and described above provides point-to-point communications between the HEU 12 and the RAU 14. Each RAU 14 communicates with the HEU 12 over a distinct downlink and uplink optical fiber pair to provide the point-to-point communications. Whenever an RAU 14 is installed in the optical fiber-based distributed antenna system 10, the RAU 14 is connected to a distinct downlink and uplink optical fiber pair connected to the HEU 12. The downlink and uplink optical fibers may be provided in the optical fiber 16. Multiple downlink and uplink optical fiber pairs can be provided in a fiber optic cable to service multiple RAUs 14 from a common fiber optic cable. For example, with reference to FIG. 3, RAUs 14 installed on a given floor 72, 74, or 76 may be serviced from the same optical fiber 16. In this regard, the optical fiber 16 may have multiple nodes where distinct downlink and uplink optical fiber pairs can be connected to a given RAU 14.

It may be desirable to provide an optical fiber-based distributed antenna system that can support a wide variety of radio sources. For example, it may be desired to provide an optical fiber-based distributed antenna system that can support various radio types and sources, including but not limited to Long Term Evolution (LTE), US Cellular (CELL), Global System for Mobile Communications (GSM), Code Division Multiple Access (CDMA), Time Division Multiple Access (TDMA), Advanced Wireless Services (AWS), iDEN (e.g., 800 MegaHertz (MHz), 900 MHz, and 1.5 GHz), etc. These radios sources can range from 400 MHz to 2700 MHz as an example. To support a radio source, the HEU must contain lasers that are capable of modulating the radio signal into optical RF communications signals at the frequency of the radio signal for transmission over optical fiber. Likewise, lasers must be provided to convert the optical RF communications signals back into electrical RF communications signals at the frequencies of the radio band supported. It is costly to provide different conversion lasers for all possible radio sources that may be desired to be supported by an optical fiber-based distributed antenna system.

In this regard, embodiments disclosed herein include providing sectorization in distributed antenna systems, and related components and methods. As one non-limiting example, the distributed antenna systems may be optical fiber-based distributed antenna systems. The antenna units in the distributed antenna systems can be sectorized. In this regard, one or more radio bands distributed by the distributed antenna systems can be allocated to one or more sectors. The antenna units in the distributed antenna systems are also allocated to one or more sectors. In this manner, only radio frequency (RF) communications signals in the radio band(s) allocated to given sector(s) are distributed the antenna unit allocated to the same sector(s). The bandwidth capacity of the antenna unit is split among the radio band(s) allocated to sector(s) allocated to the antenna unit. The sectorization of the radio band(s) and the antenna units can be configured and/or altered based on capacity needs for given radio bands in antenna coverage areas provide by the antenna units.

Figure 4:
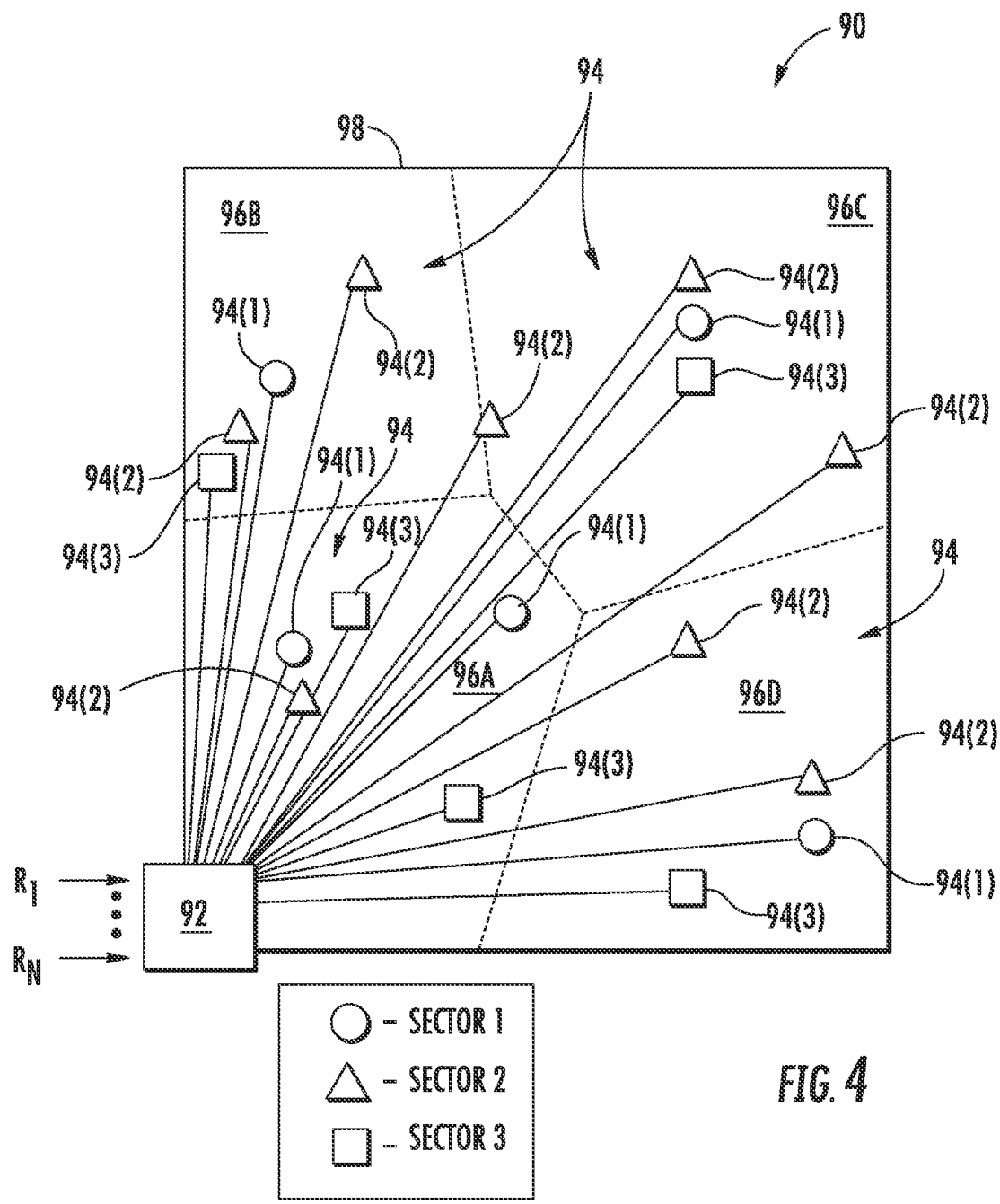
FIG. 4 is an schematic diagram illustrating exemplary sectorization in a distributed antenna system.

FIG. 4 is a schematic diagram to illustrate an example of providing sectorization in a distributed antenna system. In this regard as illustrated in FIG. 4, a distributed antenna system 90 is provided. The distributed antenna system 90 can be, without limitation, an optical fiber-based distributed antenna system. The distributed antenna system 90 can include the exemplary distributed antenna systems discussed above in FIGS. 1-3, or any of the other exemplary distributed antenna systems disclosed herein. The distributed antenna system includes an HEU 92 that is configured to receive and distribute RF communication signals in a plurality of radio bands or frequencies $R_1$-$R_N$. The HEU 92 is configured to distribute the radio bands $R_1$-$R_N$ to a plurality of RAUs 94 communicatively coupled to the HEU 94. For example, the RAUs 94 may be distributed in multiple floors 96A-96D in a building 98 or other facility. The HEU 92 is configured to sectorize the RAUs 94 into different sectors. One or more of the radio bands $R_1$-$R_N$ can be allocated to each sector.

In this example, the RAUs 94 are allocated to one of three (3) sectors. For example, RAUs 94(1) allocated to a first sector are shown as circle symbols in FIG. 4. RAUs 94(2) allocated to a second sector are shown as triangle symbols in FIG. 4. RAUs 94(3) allocated to a third sector are shown as square symbols in FIG. 4. The RAUs 94 are allocated to one or more sectors as a method of controlling how many radio bands $R_1$-$R_N$ are supported by the RAUs 94 and in which the bandwidth of the RAUs 94 are split. As capacity and performance requirements or needs change for the distributed antenna system 90, the sector allocated to particular RAUs 94 can be changed and/or the radio bands $R_1$-$R_N$ allocated to a given sector can be changed. The sector allocated to a given RAU 94 can also be changed or reconfigured flexibly and seamlessly to change how the bandwidth of the RAUs 94 is split among allocated radio bands $R_1$-$R_N$. Deployment of additional RAUs 94 to change the amount of bandwidth dedicated to particular radio bands $R_1$-$R_N$ is not required.

Figure 5:
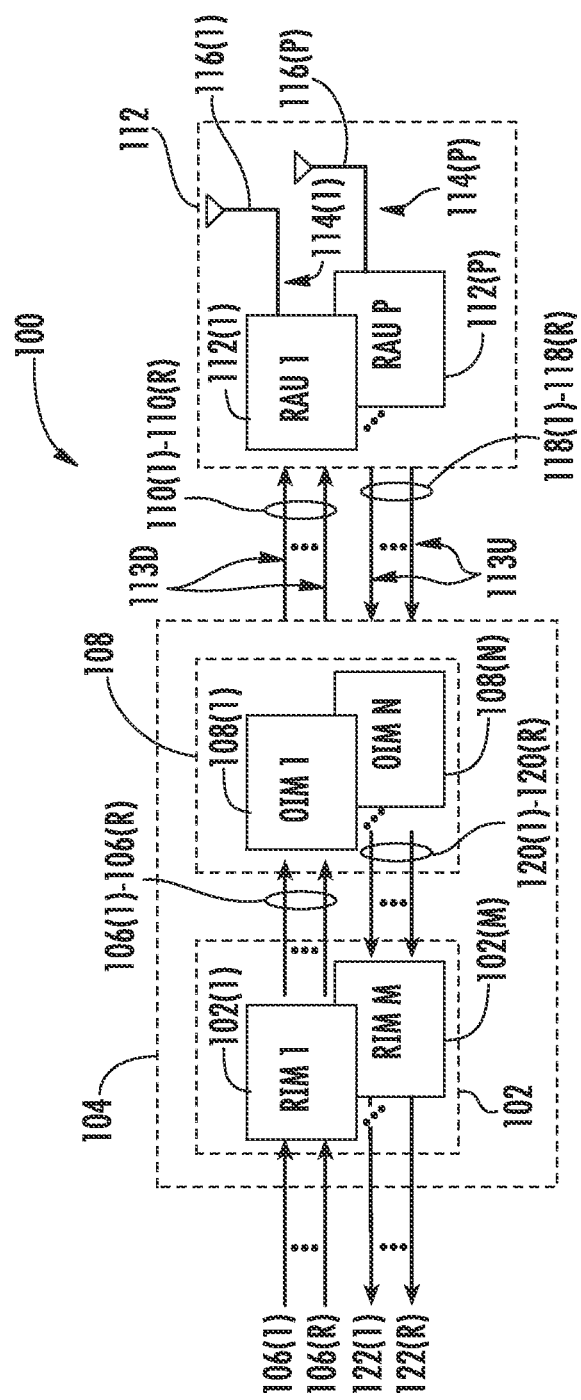
FIG. 5 is a schematic diagram of another exemplary optical fiber-based distributed antenna system.

FIG. 5 is a schematic diagram of another exemplary distributed antenna system 100 that can support sectorization. In this embodiment, the distributed antenna system 100 is an optical fiber-based distributed antenna system comprised of three main components. One or more radio interfaces provided in the form of radio interface modules (RIMs) 102(1)-102(M) in this embodiment are provided in head end equipment 104 to receive and process downlink electrical RF communications signals 106(1)-106(R) prior to optical conversion into downlink optical RF communications signals. The processing of the downlink electrical RF communications signals 106(1)-106(R) can include any of the procession previously described above in the HEU 12 in FIG. 2. The notations "1-R" and "1-M" indicate that any number of the referenced component, 1-R and 1-M, respectively, may be provided. As will be described in more detail below, the head end equipment 104 in this embodiment is configured to accept a plurality of RIMs 102(1)-102(M) as modular components that can be easily installed and removed or replaced in the HEU 104. In one embodiment, the head end equipment 104 is configured to support up to four (4) RIMs 102(1)-102(M) as an example.

Each RIM 102(1)-102(M) can be designed to support a particular type of radio source or range of radio sources (i.e., frequencies) to provide flexibility in configuring the head end equipment 104 and optical fiber-based distributed antenna system 100 to support the desired radio sources. For example, one RIM 102 may be configured to support the Personal Communication Services (PCS) radio band. Another RIM 102 may be configured to support the Long Term Evolution (LTE) 700 radio band. In this example, by inclusion of these RIMs 102, the head end equipment 104 would be configured to support and distribute RF communications signals on both PCS and LTE 700 radio bands. RIMs 102 may be provided in the head end equipment 104 that support any other radio bands desired, including but not limited to PCS, LTE, CELL, GSM, CDMA, CDMA2000, TDMA, AWS, iDEN (e.g., 800 MHz, 900 MHz, and 1.5 GHz), Enhanced Data GSM Environment, (EDGE), Evolution-Data Optimized (EV-DO), 1xRTT (i.e., CDMA2000 1X (IS-2000)), High Speed Packet Access (HSPA), 3GGP1, 3GGP2, and Cellular Digital Packet Data (CDPD). More specific examples include, but are not limited to, radio bands between 400-2700 MHz including but not limited to 700 MHz (LTE), 698-716 MHz, 728-757 MHz, 776-787 MHz, 806-824 MHz, 824-849 MHz (US Cellular), 851-869 MHz, 869-894 MHz (US Cellular), 880-915 MHz (EU R), 925-960 MHz (TTE), 1930-1990 MHz (US PCS), 2110-2155 MHz (US AWS), 925-960 MHz (GSM 900), 1710-1755 MHz, 1850-1915 MHz, 1805-1880 MHz (GSM 1800), 1920-1995 MHz, and 2110-2170 MHz (GSM 2100).

The downlink electrical RF communications signals 106(1)-106(R) are provided to a plurality of optical interfaces provided in the form of optical interface modules (OIMs) 108(1)-108(N) in this embodiment to convert the downlink electrical RF communications signals 106(1)-106(N) into downlink optical signals 110(1)-110(R). The notation "1-N" indicates that any number of the referenced component 1-N may be provided. One downlink optical fiber 113D and one uplink optical fiber 113U could be provided to support multiple channels each using WDM, as discussed in U.S. patent application Ser. No. 12/892,424 previously referenced above. Other options for WDM and FDM are also disclosed in U.S. patent application Ser. No. 12/892,424, any of which can be employed in any of the embodiments disclosed herein.

In this embodiment, the OIMs 108(1)-108(N) are provided in a common housing provided for the head end equipment 104 with the RIMs 102(1)-102(M). Alternatively, the OIMs 108(1)-108(N) could be located separately from the RIMs 102(1)-102(M). The OIMs 108 may be configured to provide one or more optical interface components (OICs) that contain O/E and E/O converters, as will be described in more detail below. The OIMs 108 support the radio bands that can be provided by the RIMs 102, including the examples previously described above. Thus, in this embodiment, the OIMs 108 may support a radio band range from 400 MHz to 2700 MHz, as an example, so providing different types or models of OIMs 108 for narrower radio bands to support possibilities for different radio band supported RIMs 102 provided in the head end equipment 104 is not required. Further, as an example, the OIMs 108s may be optimized for sub-bands within the 400 MHz to 2700 MHz frequency range, such as 400-700 MHz, 700 MHz-1 GHz, 1 GHz-1.6 GHz, and 1.6 GHz-2.7 GHz, as examples.

The OIMs 108(1)-108(N) each include E/O converters to convert the downlink electrical RF communications signals 106(1)-106(R) to downlink optical signals 110(1)-110(R). The downlink optical signals 110(1)-110(R) are communicated over downlink optical fiber(s) 113D to a plurality of RAUs 112(1)-112(P). The notation "1-P" indicates that any number of the referenced component 1-P may be provided. O-E converters provided in the RAUs 112(1)-112(P) convert the downlink optical signals 110(1)-110(R) back into downlink electrical RF communications signals 104(1)-104(R), which are provided over links 114(1)-114(P) coupled to antennas 116(1)-116(P) in the RAUs 112(1)-112(P) to client devices in the reception range of the antennas 116(1)-116(P).

E/O converters are also provided in the RAUs 112(1)-112(P) to convert uplink electrical RF communications signals received from client devices through the antennas 116(1)-116(P) into uplink optical signals 118(1)-118(R) to be communicated over uplink optical fibers 113U to the OIMs 108(1)-108(N). The OIMs 108(1)-108(N) include O/E converters that convert the uplink optical signals 118(1)-118(R) into uplink electrical RF communications signals 120(1)-120(R) that are processed by the RIMs 102(1)-102(M) and provided as uplink electrical RF communications signals 122(1)-122(R).

Figure 6:
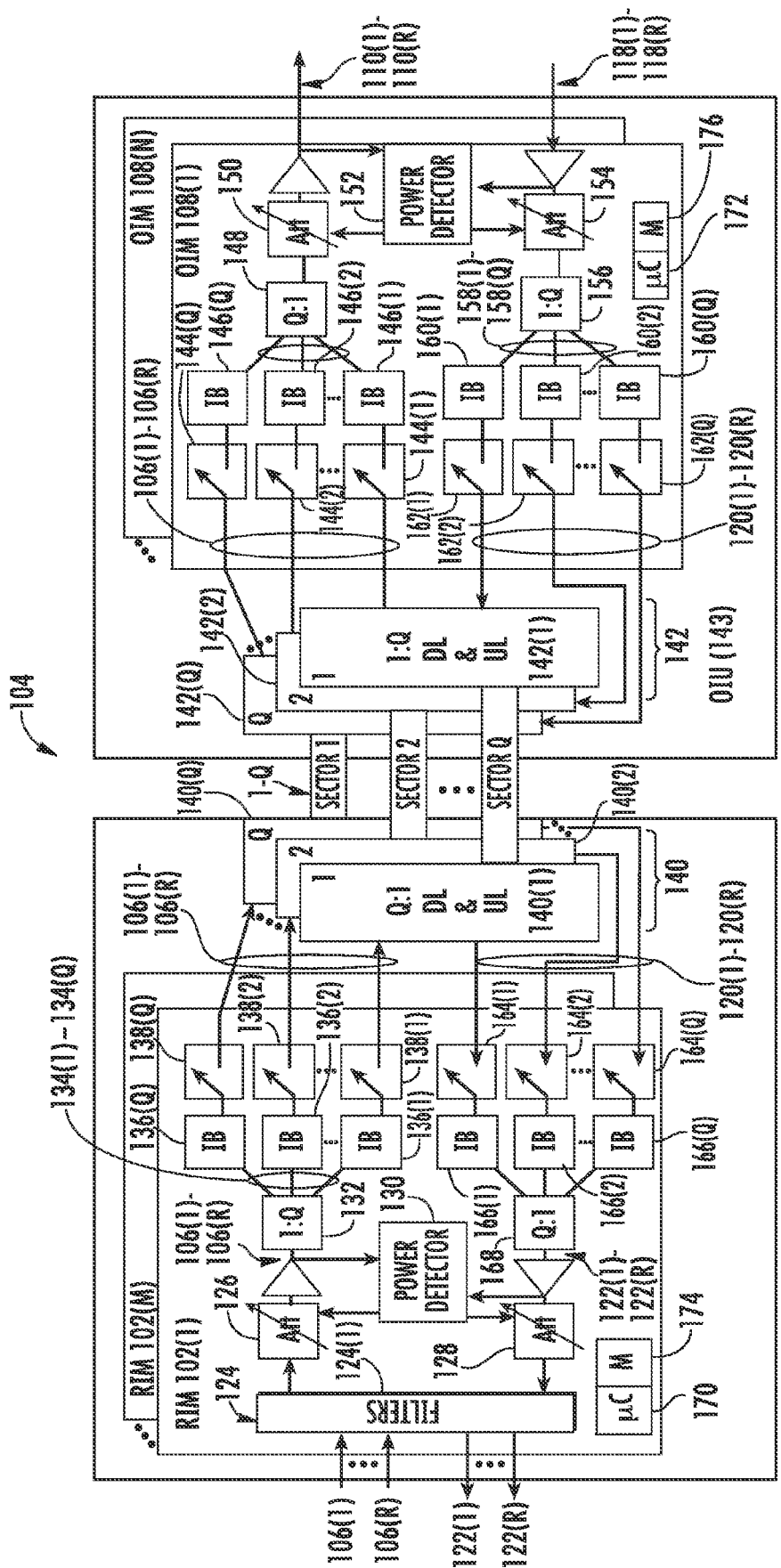
FIG. 6 is a schematic diagram of exemplary head end equipment provided in a distributed antenna system supporting configurable sectorization in the distributed antenna system.

FIG. 6 is a schematic diagram illustrating more detail regarding the internal components of the head end equipment 104 in FIG. 5 supporting sectorization of RAUs 112 to particular radio bands. Each RIM 102(1)-102(M) includes one or more filters 124 that are configured to filter out the undesired radio bands for the RIM 102 from the received downlink electrical RF communications signals 106(1)-106(R) and uplink electrical RF communications signals 122(1)-122(R). Although multiple downlink electrical RF communications signals 106(1)-106(R) and uplink electrical RF communications signals 122(1)-122(R) are shown, it is understood that only a subset of these signals may be distributed by each RIM 102 according to the filters 124 and radio band of the received uplink electrical RF communications signals 120(1)-120(R) from the OIMs 108. A downlink attenuator 126 and uplink attenuator 128 are provided to control the power level of the downlink electrical RF communications signals 106(1)-106(R) and uplink electrical RF communications signals 122(1)-122(R), respectively. A power detector 130 may be provided to detect the power levels of the downlink electrical RF communications signals 106(1)-106(R) and uplink electrical RF communications signals 122(1)-122(R) for setting the power levels and/or calibrating the downlink and uplink attenuators 126, 128 to provide the desired power levels of these signals. Examples of setting power levels and/or calibrating downlinks and uplinks in head end equipment for a distributed antenna system are provided U.S. Provisional Patent Application Ser. Nos. 61/230,463 and 61/230,472, both of which are incorporated herein by reference in their entireties.

Each of the RIMs 102(1)-102(M) includes a 1:Q downlink splitter 132 to split the received downlink electrical RF communications signals 106(1)-106(R) into a plurality of the downlink electrical RF communications signals 106(1)-106(R) in distinct downlink paths 134(1)-134(Q) to allow sectorization. "Q" represents the number of possible sectors that can be provided by the head end equipment 104. Splitting the downlink electrical RF communications signals 106(1)-106(R) into a plurality of the downlink paths 134(1)-134(Q) allows the received downlink electrical RF communications signals 106(1)-106(R) to be allocated to different sectors. Each of the downlink paths 134(1)-134(Q) includes an isolation block 136(1)-136(Q) coupled to a downlink sector switch 138(1)-138(Q). Each downlink sector switch 138(1)-138(Q) represents a sector 1-Q in the head end equipment 104. The downlink sector switches 138(1)-138(Q) control whether a split downlink electrical RF communications signal 106(1)-106(R) is provided to a given sector 1-Q. Since each downlink sector switch 138(1)-138(Q) represents a given sector 1-Q, the radio band or bands supported by a given RIM 102 can be allocated to a given sector or sectors based on activation of the downlink sector switches 138(1)-138(Q).

The outputs of the downlink sector switches 138(1)-138(Q) are directed to a RIM distribution matrix 140. The RIM distribution matrix 140 is comprised of RIM interfaces 140(1)-140(Q) that interface each of the downlink paths 134(1)-134(Q) (i.e. sectors) in each of the RIMs 102(1)-102(M) to each of the OIMs 108(1)-108(N). In this manner, the downlink sector switches 138(1)-138(Q) activated in the RIMs 102(1)-102(M) define the radio bands provided for each sector 1-Q. For example, if downlink sector switches 138(1) and 138(2) are activated for RIM 102(1), the radio band(s) filtered by the filters 124 for the RIM 102(1) will be provided on sectors 1 and 2. Thus, any RAUs 112 allocated to sectors 1 and 2 will receive RF communications signals for the radio band(s) filtered by the filters 124 for the RIM 102(1) and will be provided on sectors 1 and 2. If the downlink sector switches 138(1) and 138(2) are activated, for example, in any other of the RIMs 102(2)-102(M), the radio band(s) filtered by those RIMs 102(2)-102(M) will also be provided to RAUs 112 allocated to sectors 1 and 2. In this manner, the radio bands provided in the available sectors 1-Q can be controlled by controlling the downlink sector switches 138(1)-138(Q) in the RIMs 102(1)-102(M).

The RIM distribution matrix 140 and the RIM interfaces 140(1)-140(Q) provided therein for each sector 1-Q are coupled to a complementary OIM distribution matrix 142 in an optical interface unit (OIU) 143. The OIM distribution matrix 142 is comprised of a plurality of OIM interface cards 142(1)-142(Q) for each sector. The OIM interface cards 142(1)-142(Q) interface each of the sectors 1-Q to each of the OIMs 108(1)-108(N). Thus, the downlink electrical RF communications signals 106(1)-106(R) allocated to the sectors 1-Q in the RIMs 102(1)-102(M) are provided to the OIMs 108(1)-108(N) to be distributed to the RAUs 112 coupled to the OIMs 108(1)-108(N). Downlink sector switches 144(1)-144(Q) are provided in each OIM 108(1)-108(N) to control which sectors among sectors 1-Q a particular OIM 108(1)-108(N) will support. Activation of the downlink sector switches 144(1)-144(Q) controls whether the OIM 108 supports a given sector 1-Q. A sector(s) selected as being supported by a particular OIM 108 in this embodiment means, in turn, that the RAUs 112 supported by the OIM 108 are allocated to the selected sector(s). For example, if three (3) RAUs 112 are supported by a particular OIM 108, each of these three (3) RAUs 112 will be allocated to the same sectors according to the settings of the downlink sector switches 144(1)-144(Q) in the OIM 108.

The outputs of the downlink sector switches 144(1)-144(Q) in each OIM 108(1)-108(N) are coupled to isolations blocks 146(1)-146(Q), which are coupled to a Q:1 combiner 148. The combiner 148 combines all of the downlink electrical RF communications signals 106(1)-106(R) for the sectors 1-Q selected for an OIM 108 to provide optically converted downlink electrical RF communications signals 106(1)-106(R) for the selected sectors 1-Q as downlink optical RF communications signals 110(1)-110(R) to the RAUs 112 coupled to the OIM 108. A downlink attenuator 150 is provided in each OIM 108(1)-108(N) to allow the power level of the downlink optical RF communications signals 110(1)-110(R) to be controlled and for calibration purposes. A power detector 152 is included in each OIM 108(1)-108(N) to detect the power levels of the downlink optical RF communications signals 110(1)-110(R) to control the setting of the downlink attenuator 150.

Sectorization can also be provided in the uplink paths of the head end equipment 104 to direct uplink optical RF communication signals 118 from the RAUs 112 to the appropriate RIMs 102(1)-102(M) based on the sectors allocated to the RAUs 112 discussed above. In this regard, with continuing reference to FIG. 6, each OIM 108(1)-108(N) includes an uplink attenuator 154 to control the power level of the uplink optical RF communication signals 118(1)-118(R) received from the RAUs 112 supported by the OIM 108(1)-108(N). A 1:Q optical splitter 156 is provided to split the uplink optical RF communication signals 118(1)-118(R) into separate uplink paths 158(1)-158(Q) for each sector 1-Q. In this manner, the uplink paths 158(1)-158(Q), after being isolated by isolation blocks 160(1)-160(Q), can be controlled by uplink sector switches 162(1)-162(Q) provided for each sector 1-Q. Uplink sector switches 162(1)-162(Q) control providing each of the split plurality of uplink optical RF communications signals 118(1)-118(R) to the same sectors 1-Q selected for the OIM 108 according to the activation of the downlink sector switches 144(1)-144(Q). In this manner, the uplink electrical RF communications signals 120(1)-120(R) will be provided to the appropriate RIMs 102(1)-102(M) through the distribution matrices 140, 142.

The RIMs 102(1)-102(M) each include uplink sector switches 164(1)-164(Q) for each sector 1-Q to allow the uplink electrical RF communications signals 120(1)-120(R) from the RAUs 112 allocated to sectors to be passed through the RIMs 102(1)-102(M) allocated to the corresponding sectors. The settings of the uplink sector switches 164(1)-164(Q) for a particular RIM 102 will be the same as the downlink sector switches 138(1)-138(Q) for the RIM 102. The uplink electrical RF communications signals 120(1)-120(R) that are allowed to pass via selection of the uplink sector switches 164(1)-164(Q) are isolated via isolation blocks 166(1)-166(Q) and are passed to a Q:1 combiner 168. The Q:1 combiner 168 combines the uplink electrical RF communications signals 120(1)-120(R) from the RAUs 112 allocated to the same sectors as selected for the RIM 102 according to the uplink sector switches 164(1)-164(Q) to be provided as uplink electrical RF communications signals 122(1)-122(R) from the RIMs 102(1)-102(M).

Sectors can be configured for the RIMs 102(1)-102(M) and OIMs 108(1)-108(N) in any number of manners. For instance, the sector switches 138(1)-138(Q), 144(1)-144(Q), 162(1)-162(Q), 164(1)-164(Q) can be provided by manually actuated switches provided in the head end equipment 104. Alternatively, the sector switches 138(1)-138(Q), 144(1)-144(Q), 162(1)-162(Q), 164(1)-164(Q) can be programmed or changed via control other than manual control. For example, the RIMs 102(1)-102(M) may each include a controller 170, such as a microcontroller or microprocessor for example as illustrated in FIG. 6, that is configured to control the RIM sector switches 138(1)-138(Q), 164(1)-164(Q). Similarly, the OIMs 108(1)-108(N) may each include a controller 172, such as a microcontroller or microprocessor 170 for example, that is configured to control the OIM sector switches 144(1)-144(Q), 162(1)-162(Q). The controllers 170, 172 may be communicatively coupled to an interface, such as a user interface (UI), including a graphical user interface (GUI), that allows a user to configure the settings of the sector switches 138(1)-138(Q), 144(1)-144(Q), 162(1)-162(Q), 164(1)-164(Q) to provide the desired sectorization of the RAUs 112. Examples of providing access to the head end equipment 104 to control settings of components in the head end equipment 104 are provided in U.S. Provisional Patent Application Ser. No. 61/230,472 incorporated herein by reference in its entirety.

Figure 7:
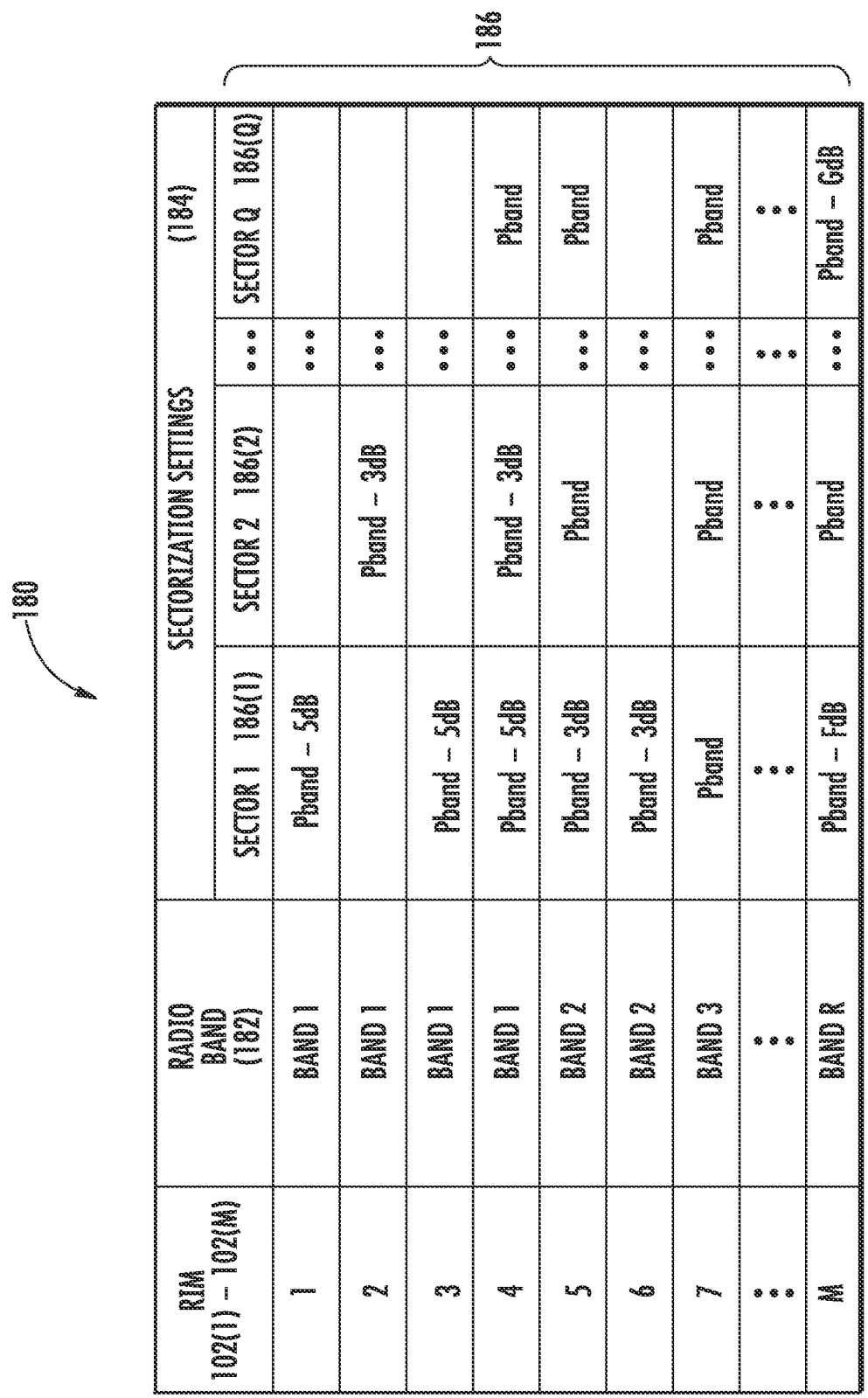
FIG. 7 is an exemplary sectorization table provided in head end equipment to store a default and/or user-configured sectorization for a distributed antenna system.

With continuing reference to FIG. 6, the sectorization settings may be stored in memory 174, 176 associated with each of the RIMs 102(1)-102(M) and OIMs 108(1)-108(N), respectively. The controllers 170, 172 may be configured to alter and/or update the sectorizations for the RIMs 102(1)-102(M) and OIMs 108(1)-108(N) by setting sectorization settings in the memory 174, 176. The controllers 170, 172 can then consul the memory 174, 176 to apply configured or programmed settings to the sector switches 138(1)-138(Q), 144(1)-144(Q), 162(1)-162(Q), 164(1)-164(Q) to provide the desired sectorization in the distributed antenna system 100. In this regard, FIG. 7 illustrates an exemplary RIM sectorization table 180 that can be provided in the memory 174 in the RIMs 102(1)-102(M) to store default and/or configured sectorization settings for the sector switches 138(1)-138(Q), 164(1)-164(Q) in the RIMs 102(1)-102(M). A similar sectorization table could be provided in the memory 176 of the OIMs 108(1)-108(N) to store default and/or configured sectorization settings for the sector switches 144(1)-144(Q), 162(1)-162(Q) in the RIMs 102(1)-102(M).

With continuing reference to FIG. 7, the RIM sectorization table 180 in this example is a two-dimensional table to allow for sectorization settings to be provided for each RIM 102(1)-102(M) configured in the head end equipment 104. The radio band filtered and allowed to pass through each RIM 102(1)-102(M) is provided in a radio band column 182 in the RIM sectorization table 180. The pass through radio band for the RIMs 102 may be a static setting, or if the filters 124 in the RIMs 102(1)-102(M) are configurable, the pass through radio band stored in the radio band column 182 may be configurable.

For each RIM 102(1)-102(M) and radio band 182 configuration, sectorization settings 184 are provided in the RIM sectorization table 180. In this example, if the pass through radio band configured for a given RIM 102(1)-102(M) is configured to be provided for a given sector or sectors, a "Pband" setting is provided in the sectors row 186 for the RIM 102 under the sectors to be activated, as illustrated in FIG. 7. A gain setting may also be provided, as illustrated in the RIM sectorization table 180. For example, RIM 102(M) is assigned to Sector 1 186(1) with a gain adjustment of −FdB, wherein F=10 Log [n] dB, where n is the active number of services provided on the same radio band. For example if three (3) services are deployed in the same radio band per sector, the gain adjustment could be Pband −5 dB per service.

The appropriate sector switches 138(1)-138(Q), 164(1)-164(Q) are activated according to the sector settings for the RIMs 102(1)-102(M) in the sectors row 186. For example, for the RIM 102(3) in the RIM sectorization table 180, sector switches 138(1), 164(1) will be activated with the other sector switches 138(2)-138(Q), 164(2)-164(Q) deactivated for the RIM 102(3) to pass through radio band "Band 1" to be included Sector 1 and provided to RAUs 112 allocated to Sector 1 in the OIMs 108(1)-108(N). Further, an attenuation level may be provided for a sector setting that is applied to the downlink attenuator 126 in the RIMs 102(1)-102(M).

Figure 8:
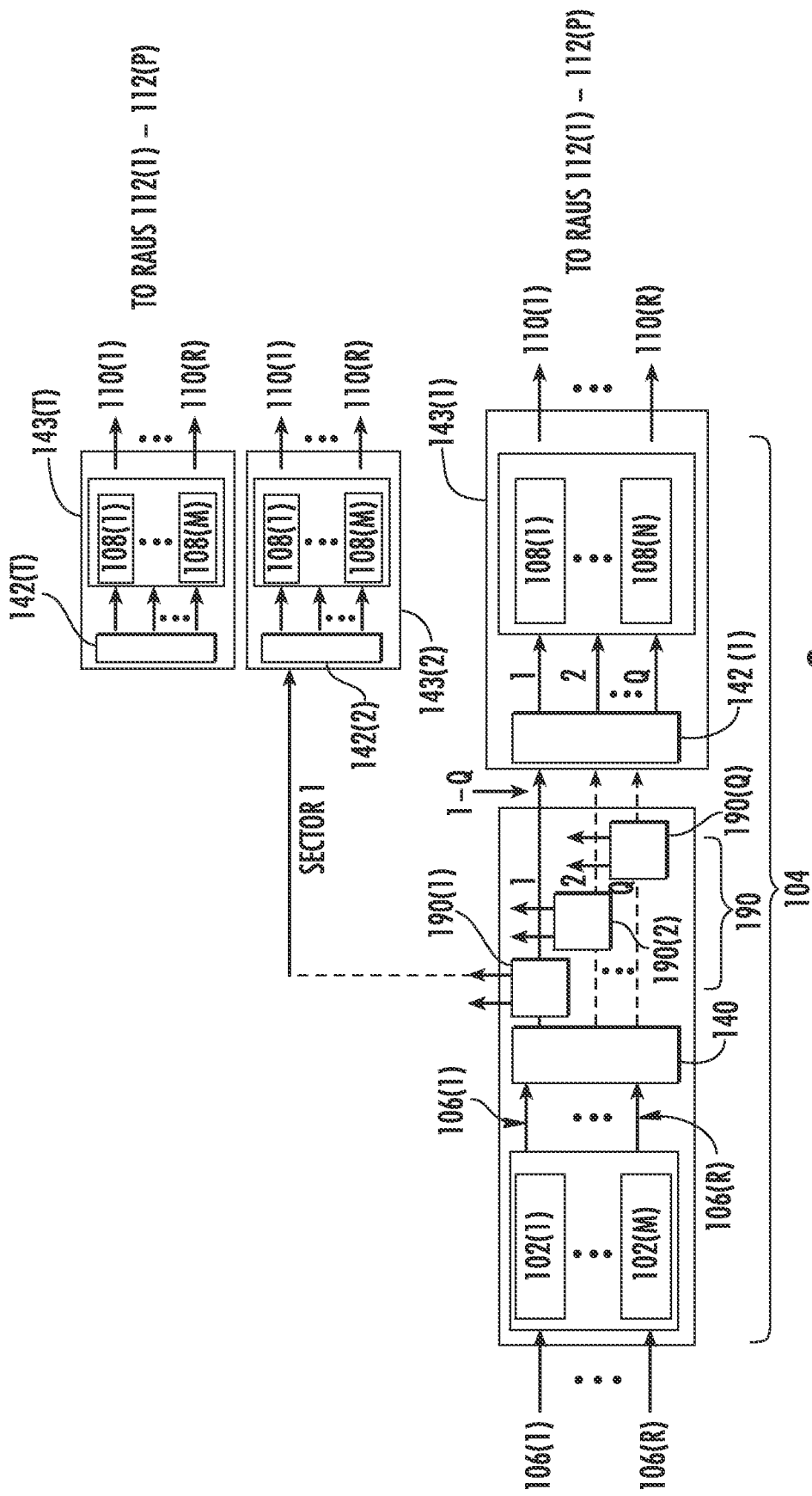
FIG. 8 is a schematic diagram of exemplary head end equipment provided in a distributed antenna system and configured with expansion ports to support additional remote antenna units, wherein one expansion port supports an optical interface unit (OIU) supporting a single sector.

Other configurations of allocating sectors to OIMs may be provided. For example, it may be desired to allocate additional RAUs 112 to a sector(s) that can be supported in the head end equipment 104 in FIGS. 5 and 6 as an example. For example, if the optical interface component (OIU) 143 supporting the OIMs 108(1)-108(N) in FIG. 6 is configured to support thirty-six (36) RAUs 112(1)-112(P), and it is desired to allocate additional RAUs to a sector or sectors in the head end equipment 104, such would not be possible with the example head end equipment 104 in FIG. 6. In this regard, FIG. 8 is a schematic diagram of the exemplary head end equipment 104 in FIGS. 5 and 6, but configured with one or more expansion ports 190 to allow additional OIUs 143(2)-143(T) to be allocated to a sector or sectors provided by the head end equipment 104. The notation "T" indicates that any number of additional OIUs may be provided.

As illustrated in FIG. 8, expansion ports 190(1)-190(Q) are provided in the head end equipment 104 to receive RF communications signals assigned to a sector(s) in the RIMs 102(1)-102(M) provided in the head end equipment 104. Additional OIUs 143(2)-143(T) each supporting the OIMs 108(1)-108(N) that each support the RAUs 112(1)-112(P) can be coupled to the expansion ports 190(1)-190(Q). In this manner, the additional RAUs 112(1)-112(P) supported by the OIMs 108(1)-108(M) in the OIUs 143(2)-143(T) can be allocated to sectors provided by the head end equipment 104. For example, as illustrated in FIG. 8, an OIM distribution matrix 142(2) provided in the OIU 143(2) is coupled to the expansion port 190(1) for Sector 1 so that OIMs 108(1)-108(N) in the OIC 143(2) can be configured to receive RF communications signals from the RIMs 102(1)-102(M) in the head end equipment 104 configured for Sector 1. The sector switches (not shown) in the OIMs 108(1)-108(N) in the OIU 143(2) can be set to allocate RAUs 112(1)-112(P) supported by the OIU 143(2) to Sector 1, if desired. Note that FIG. 8 only illustrates the expansion ports 190 being provided in the downlink of the head end equipment 104, but expansion ports can also be provided in the uplink of the head end equipment 104 as well.

Figure 9:
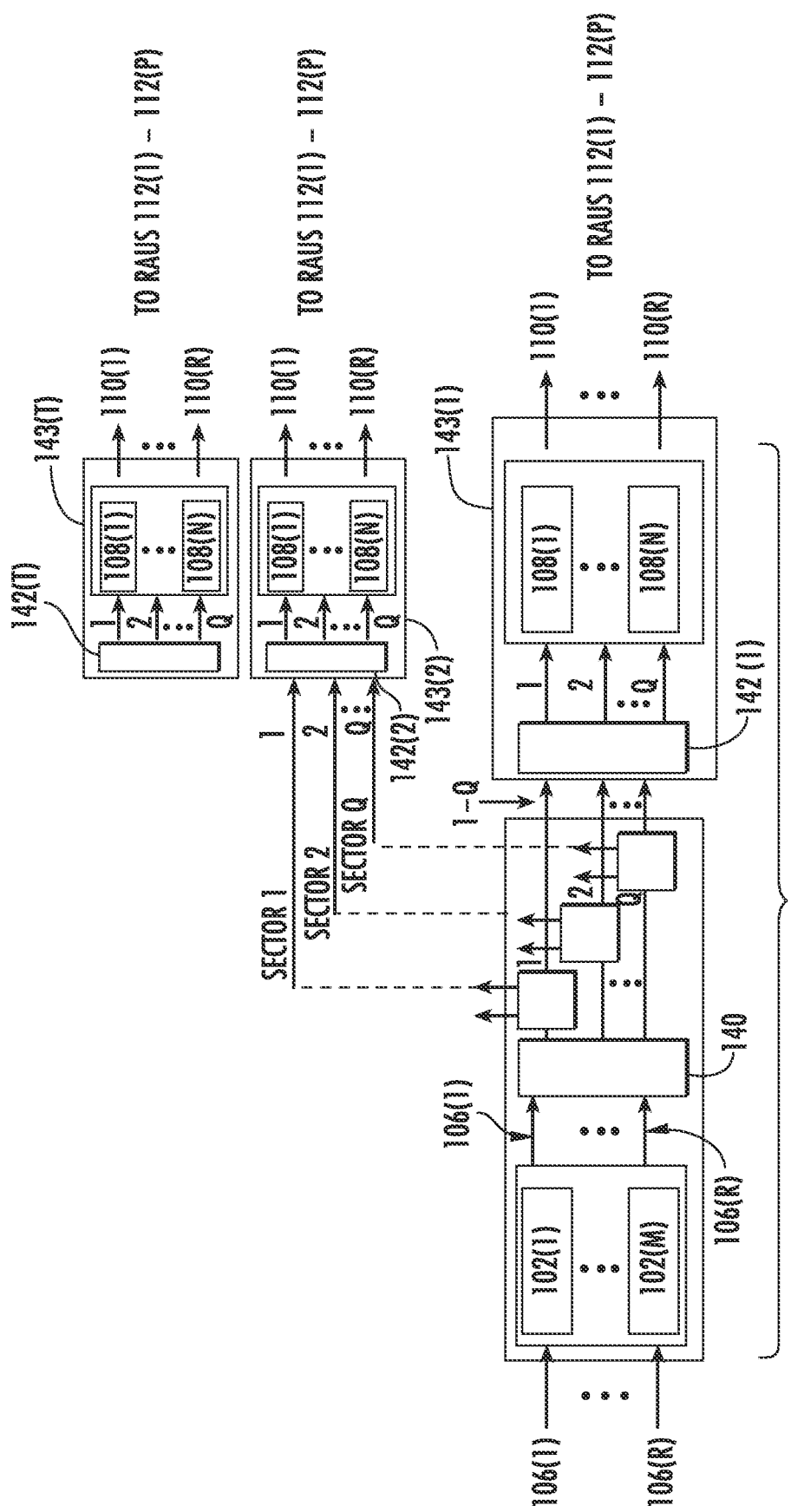
FIG. 9 is a schematic diagram of exemplary head end equipment provided in a distributed antenna system and configured with expansion ports to support additional remote antenna units, wherein multiple expansion ports support an OIU supporting multiple sectors.

The RAUs 112(1)-112(P) supported by the OIU 143(2) in FIG. 8 can only be allocated to one sector provided in the head end equipment 104, which is Sector 1 in this example, because the OIU 143(2) is not coupled to the other expansion ports 190(2)-190(Q) in the head end equipment 104. However, in FIG. 9, the OIU 143(2) is configured to be coupled to each of the sectors provided by the head end equipment 104. In this manner, the RAUs 112(1)-112(P) supported by the OIMs 108(1)-108(N) in the OIU 143(2) can be allocated to any of the sectors provided by the head end equipment 104. Thus, the OIU 143(2) is configured to provide multiple sectors to the RAUs 112(1)-112(P) supported by the OIMs 108(1)-108(N) in the OIU 143(2). Note that FIG. 9 only illustrates the expansion ports 190 being provided in the downlink of the head end equipment 104, but expansion ports can also be provided in the uplink of the head end equipment 104 as well.

Figure 10:
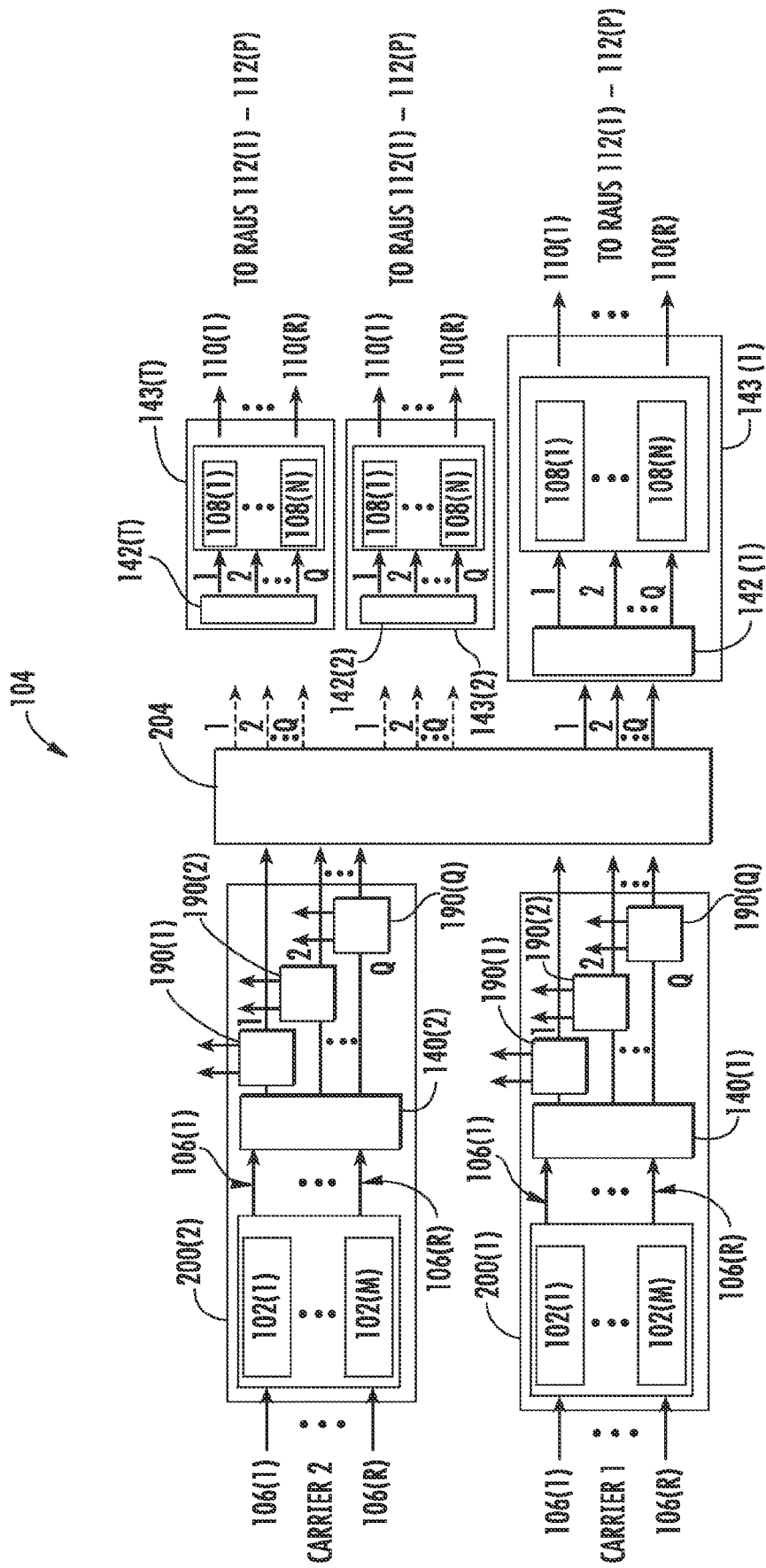
FIG. 10 is a schematic diagram of an exemplary radio distribution matrix provided for a head end equipment to allow multiple carriers to utilize common optical interface modules (OIMs) and RAUs to distribute communications signals in a distributed antenna system

The head end equipment 104 can also be configured to share components with multiple carriers. For example, a distributed antenna system may include multiple carriers. Further, an installation of a distributed antenna system with a first carrier may be later configured to support other carriers. In this regard, FIG. 10 illustrates the head end equipment 104 where two (2) carriers (CARRIER 1 and CARRIER 2) provide their own respective downlink electrical RF communications signals 106(1)-106(R) to radio interfaces 200(1), 200(2), respectively, having their own dedicated RIMs 102(1)-102(M). An external radio distribution matrix 204 is provided that allows each of the RIMs 102(1)-102(M) provided in the radio interfaces 200(1), 200(2) to share the same OIUs 143(1)-143(T) and supported RAUs 112(1)-112(P). In this manner, additional OIUs 143 and associated cabling are not required for each carrier to route RF communications signals to the shared RAUs 112(1)-112(P). RAUs 112(1)-112(P) can be allocated to sectors that include RF communications signals from both carriers.

Figure 11:
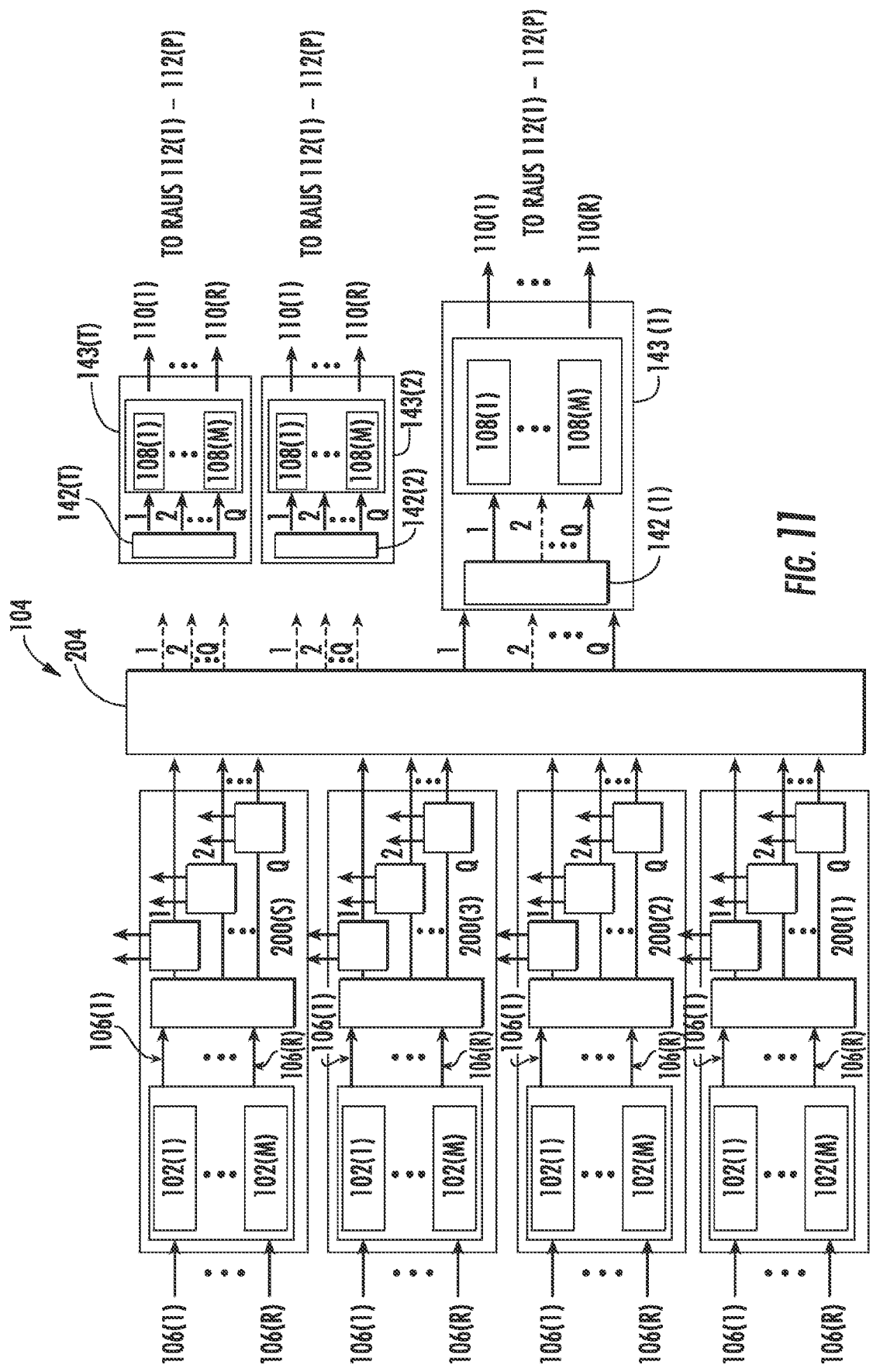
FIG. 11 is a schematic diagram of providing an expanded number of sectors in a distributed antenna system.

The head end equipment 104 can also be configured to provide additional sectors as illustrated in FIG. 11. For example, if the head end equipment 104 in the previous figures supports three (3) sectors, additional radio interfaces 200(1)-200(S) can be provided, as illustrated in FIG. 11, to provide additional sectors in a modular fashion. The notation "S" indicates that any number of radio interfaces may be provided. The external radio distribution matrix 204 routes the expanded sectors to the OIUs 143(1)-143(T) such that the RAUs 112(1)-112(P) supported by any of the OIUs 143(1)-143(T) can be allocated to any of the expanded number of sectors provided by the radio interfaces 200(1)-200(S).

Figure 12:
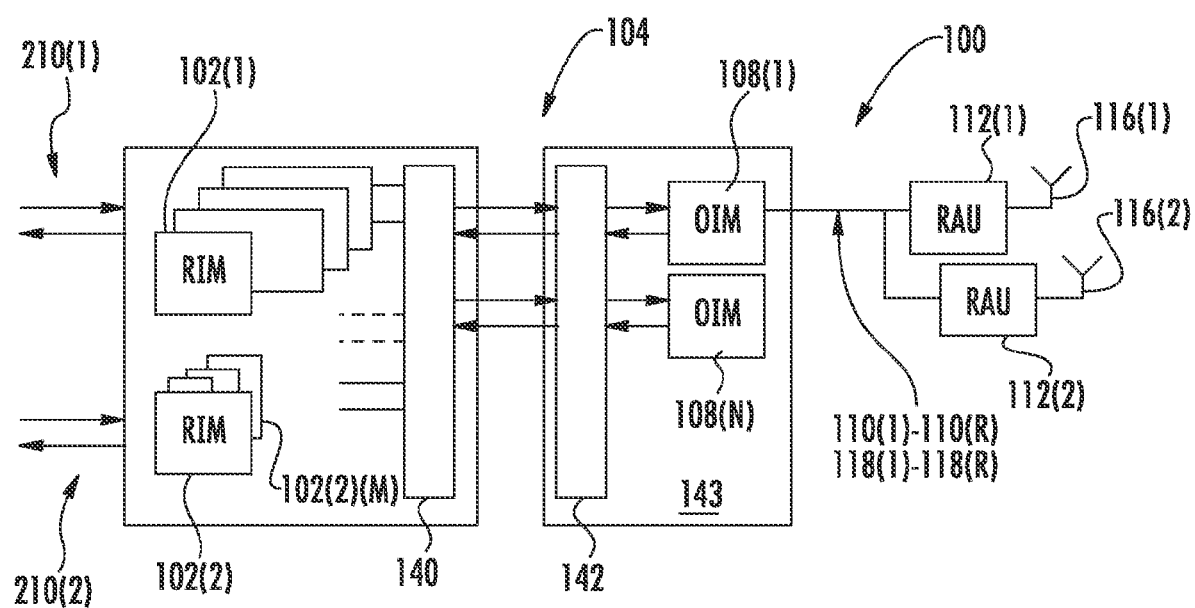
FIG. 12 is a schematic diagram of exemplary head end equipment provided in a distributed antenna system supporting sectorization and multiple-input, multiple-output (MIMO) processing in a distributed antenna system.

FIG. 12 is a schematic diagram of an exemplary head end equipment 104 provided in the distributed antenna system 100 supporting sectorization and multiple-input, multiple-output (MIMO) processing in a distributed antenna system. MIMO can provide increased bit rates or beam forming for signal-to-noise ratios (SNRs) through improved spectrum efficiency and/or wireless distance improvement. In this embodiment, MIMO is achieved by utilizing multiple spatial layers (e.g., up to four (4) layers by 3GPP standards) to a given client device.

FIG. 12 illustrates the head end equipment 104 illustrated in FIG. 5 and previously discussed configured to support 2×2 MIMO with two (2) sectors. Common elements are illustrated in FIG. 12 with common element numbers and will not be redescribed. A 2×2 MIMO scheme can be provided for the distributed antenna system 100 when two (2) RAUs 112(1), 112(2) are co-located to create two (2) spatial streams using the same frequency radio band as illustrated in FIG. 12, but any other MIMO configuration desired is also possible.

With continuing reference to FIG. 12, the first and second sectors in this example are associated with first and second radio streams 210(1), 210(2), respectively. The first and second radio streams 210(1), 210(2) each contain four (4) radio bands in this example. The RAUs 112(1), 112(2) are assigned to sectors such that all four (4) of the radio bands in the radio streams 210(1), 210(2) are delivered to two (2) RAUs 112(1), 112(2) deployed at the same location in this example. In this example, RAU 112(1) is assigned to a first sector that includes the four (4) radio bands in the first radio stream 210(1). RAU 112(2) is also assigned to the same sector as assigned to the RAU 112(1). Thus, radio communications to the RAUs can support MIMO communications across the four (4) radio bands provided in the radio streams 210(1), 210(2). The radio bands supported in MIMO communications by the RAUs 112(1), 112(2) can be changed by reassigning the RAUs 112(1), 112(2) to different sectors or reconfiguring existing sectors to which the RAUs 112(1), 112(2) are assigned.

Those of skill in the art would further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163, the disclosures of which are incorporated herein by reference in their entireties.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. An apparatus configured to distribute radio bands in one or more sectors among a plurality of sectors in a distributed antenna system, comprising:
    a plurality of radio interfaces each configured to:
        split a received downlink electrical radio frequency (RF) communications signal into a plurality of downlink electrical RF communications signals; and
        control providing each of the split plurality of downlink electrical RF communications signals to one or more sectors among a plurality of sectors in a distributed antenna system configured for the radio interface; and
    a plurality of optical interfaces each configured to:
        receive the split plurality of downlink electrical RF communications signals from the plurality of radio interfaces;
        control for which sectors among the plurality of sectors configured for the optical interface, the received split plurality of downlink electrical RF communications signals are provided to one or more remote antenna units (RAUs) communicatively coupled to the optical interface; and
        convert the received split plurality of downlink electrical RF communications signals into a plurality of downlink optical RF communications signals, wherein
    the plurality of optical interfaces are each further configured to:
        split a received uplink optical RF communications signal into a plurality of uplink optical RF communications signals;
        control providing each of the split plurality of uplink optical RF communications signals to the one or more sectors among a plurality of sectors configured for the optical interface; and
        convert the received split plurality of uplink optical RF communications signals into a plurality of uplink electrical RF communications signals; and
    the plurality of radio interfaces are each further configured to:
        receive the plurality of uplink electrical RF communications signals from the plurality of optical interfaces; and
        control for which sectors among the plurality of sectors configured for the radio interface the received plurality of uplink electrical RF communications signals are provided to one or more carriers communicatively coupled to the radio interface.

2. The apparatus of claim 1, wherein each of the plurality of optical interfaces is further configured to provide the plurality of downlink optical RF communications signals to the one or more RAUs.

3. The apparatus of claim 1, further comprising a downlink distribution matrix configured to distribute the split plurality of downlink electrical RF communications signals for the plurality of sectors.

4. The apparatus of claim 1, wherein each of plurality of radio interfaces is further configured to filter the received downlink electrical RF communications signal in a single radio band.

5. The apparatus of claim 1, wherein each of the plurality of radio interfaces further comprises a plurality of downlink sector switches each assigned to a unique sector among a plurality of sectors in the distributed antenna system, and each configured to:
    receive a downlink electrical RF communications signal among the split plurality of downlink electrical RF communications signals; and
    control whether the received downlink electrical RF communications signal is distributed to the unique sector assigned to the downlink sector switch.

6. The apparatus of claim 1, wherein each of the plurality of optical interfaces further comprises a plurality of downlink sector switches each assigned to a unique sector among the plurality of sectors in the distributed antenna system, and each configured to:
    receive a downlink electrical RF communications signal among the split plurality of downlink electrical RF communications signals for the unique sector assigned to the downlink sector switch; and
    control whether the received split downlink electrical RF communications signal is distributed to the unique sector assigned to the downlink sector switch.

7. The apparatus of claim 1, wherein each of the plurality of radio interfaces further comprises a plurality of attenuators each assigned to a sector among the plurality of sectors and configured to control a power level for the assigned sector.

8. The apparatus of claim 1, further comprising a controller configured to control for each of the plurality of radio interfaces which of the one or more sectors among the plurality of sectors the split plurality of downlink electrical RF communications signals are provided.

9. The apparatus of claim 1, further comprising a controller configured to control for each of the plurality of optical interfaces which of the one or more sectors among the plurality of sectors the split plurality of downlink electrical RF communications signals are provided.

10. The apparatus of claim 1, further comprising a controller configured to control sectorization for the plurality of radio interfaces according to a sectorization configuration stored in a sectorization table.

11. The apparatus of claim 10, wherein the sectorization table is comprised of a sector activation entry and a corresponding power level entry for each of the plurality of sectors for each of the plurality of radio interfaces.

12. The apparatus of claim 1, further comprising at least one expansion port coupled to a sector among the plurality of sectors.

13. The apparatus of claim 12, further comprising at least one additional plurality of optical interfaces coupled to the at least one expansion port.

14. The apparatus of claim 1, further comprising an external distribution matrix configured to distribute the received split plurality of downlink electrical RF communications signals for the plurality of sectors.

15. The apparatus of claim 1, wherein each of the plurality of radio interfaces is further configured to provide the received plurality of uplink electrical RF communications signals to the one or more carriers.

16. The apparatus of claim 1, further comprising an uplink distribution matrix configured to distribute the received split plurality of uplink optical RF communications signals for the plurality of sectors.

17. The apparatus of claim 1, wherein each of the plurality of optical interfaces further comprises a plurality of uplink sector switches each assigned to a unique sector among a plurality of sectors in the distributed antenna system, and each configured to:
  receive an uplink optical RF communications signal among the plurality of uplink optical RF communications signals; and
  control whether the received uplink optical RF communications signal is distributed to the unique sector assigned to the uplink sector switch.

18. The apparatus of claim 1, wherein each of the plurality of radio interfaces further comprises a plurality of uplink sector switches each assigned to a unique sector among the plurality of sectors in the distributed antenna system, and each configured to:
  receive an uplink electrical RF communications signal among the plurality of uplink electrical RF communications signals for the unique sector assigned to the uplink sector switch; and
  control whether the uplink electrical RF communications signal is distributed to the unique sector assigned to the uplink sector switch.

19. The apparatus of claim 1, further comprising a controller configured to control for each of the plurality of optical interfaces which of the one or more sectors among the plurality of sectors the split plurality of uplink optical RF communications signals are provided.

20. The apparatus of claim 1, further comprising a controller configured to control for each of the plurality of radio interfaces which of the one or more sectors among the plurality of sectors the plurality of uplink electrical RF communications signals from the plurality of optical interfaces are provided.

21. A method of distributing radio bands in one or more sectors among a plurality of sectors in a distributed antenna system, comprising:
  splitting a received downlink electrical radio frequency (RF) communications signal into a plurality of downlink electrical RF communications signals;
  controlling providing each of the split plurality of downlink electrical RF communications signals to one or more sectors among a plurality of sectors in a distributed antenna system;
  receiving the split plurality of downlink electrical RF communications signals;
  controlling for which sectors among the plurality of sectors, the received split plurality of downlink electrical RF communications signals are provided to one or more remote antenna units (RAUs) communicatively;
  converting the received split plurality of downlink electrical RF communications signals into a plurality of downlink optical RF communications signals;
  splitting a received uplink optical RF communications signal into a plurality of uplink optical RF communication signals,
  controlling providing each of the split plurality of uplink optical RF communications signals to the one or more sectors among a plurality of sectors configured for the optical interface;
  converting the received split plurality of uplink optical RF communications signals into a plurality of uplink electrical RF communications signals;
  receiving the plurality of uplink electrical RF communications signals from the plurality of optical interfaces; and
  controlling for which sectors among the plurality of sectors configured for the radio interface, the received plurality of uplink electrical RF communications signals are provided to one or more carriers communicatively coupled to the radio interface.

22. The method of claim 21, further comprising providing the plurality of downlink optical RF communications signals to the one or more RAUs.

23. The method of claim 21, further comprising distributing the split plurality of downlink electrical RF communications signals for the plurality of sectors in a distribution matrix.

24. The method of claim 21, further comprising controlling in a controller for each of the plurality of radio interfaces which of the one or more sectors among the plurality of sectors the split plurality of downlink electrical RF communications signals are provided.

25. The method of claim 21, further comprising controlling in a controller for each of the plurality of optical interfaces which of the one or more sectors among the plurality of sectors the split plurality of downlink electrical RF communications signals are provided.

26. The method of claim 21, further comprising controlling in a controller for each of the plurality of optical interfaces which of the one or more sectors among the plurality of sectors the split plurality of uplink optical RF communications signals are provided.

27. The method of claim 21, further comprising controlling in a controller for each of the plurality of radio interfaces which of the one or more sectors among the plurality of sectors the plurality of uplink electrical RF communications signals from the plurality of optical interfaces are provided.

28. The method of claim 21, wherein the at least one RAU is comprised of a plurality of RAUs, and further comprising assigning at least two of the plurality of RAUs to a MIMO communication configuration.

29. The method of claim 28, further comprising assigning the at least two of the plurality of RAUs in the MIMO configuration to the same sector among the plurality of sectors.

\* \* \* \* \*